(12) United States Patent
Jun et al.

(10) Patent No.: US 12,487,654 B2
(45) Date of Patent: Dec. 2, 2025

(54) METHOD FOR CONTROLLING POWER AND ELECTRONIC DEVICE SUPPORTING THE SAME

(71) Applicant: SAMSUNG ELECTRONICS CO., LTD., Suwon-si (KR)

(72) Inventors: Jaeyoung Jun, Suwon-si (KR);
Byoungjun Kim, Suwon-si (KR);
Sunglak Kim, Suwon-si (KR);
Hyunmuk Kim, Suwon-si (KR);
Jooyeol Ryu, Suwon-si (KR);
Shinhyuk Yoon, Suwon-si (KR);
Gyudae Jang, Suwon-si (KR);
Jinwook Choi, Suwon-si (KR);
Kangwook Byun, Suwon-si (KR);
Junyoung Choi, Suwon-si (KR);
Changryong Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 118 days.

(21) Appl. No.: 18/443,702

(22) Filed: Feb. 16, 2024

(65) Prior Publication Data
US 2024/0427402 A1 Dec. 26, 2024

Related U.S. Application Data

(63) Continuation of application No. PCT/KR2024/001529, filed on Feb. 1, 2024.

(30) Foreign Application Priority Data

Jun. 23, 2023 (KR) .......................... 10-2023-0080881
Aug. 11, 2023 (KR) .......................... 10-2023-0105784

(51) Int. Cl.
*G06F 1/00* (2006.01)
*G06F 1/16* (2006.01)
(Continued)

(52) U.S. Cl.
CPC .......... *G06F 1/3218* (2013.01); *G06F 1/1652* (2013.01); *G06F 1/1681* (2013.01); *G06F 3/0488* (2013.01); *G06F 1/3203* (2013.01)

(58) Field of Classification Search
CPC .... G06F 1/3218; G06F 1/1652; G06F 1/1681; G06F 3/0488
(Continued)

(56) References Cited

U.S. PATENT DOCUMENTS 10,139,879 B2 11/2018 Yamazaki et al.
11,990,071 B2 5/2024 Zhao
(Continued)

FOREIGN PATENT DOCUMENTS

CN 1564145 A 1/2005
JP 2019149169 A 9/2019
(Continued)

OTHER PUBLICATIONS

International Search Report and Written Opinion corresponding to Application No. PCT/KR2024/001529; Dated May 3, 2024.

*Primary Examiner* — Volvick Derose
(74) *Attorney, Agent, or Firm* — CANTOR COLBURN LLP

(57) ABSTRACT

An electronic device according to an embodiment may comprise a touch input unit, a first PMIC, a first switching circuit, and a battery controller. The battery controller may be configured to control the first switching circuit such that power is supplied from the battery to the touch input unit and no power is supplied from the battery to the first PMIC. The battery controller may be configured to, while power is supplied from the battery to the touch input unit and no power is supplied from the battery to the first PMIC, obtain an input through the touch input unit. The battery controller may be configured to control, based on obtaining the input,
(Continued)

the first switching circuit such that power is supplied from the battery to the first PMIC.

20 Claims, 18 Drawing Sheets

(51) Int. Cl.
  *G06F 1/3218* (2019.01)
  *G06F 3/0488* (2022.01)
  *G06F 1/3203* (2019.01)
(58) Field of Classification Search
  USPC .......................................................... 713/300
  See application file for complete search history.

(56) References Cited

U.S. PATENT DOCUMENTS

| | | |
|---|---|---|
| 2009/0058664 A1 | 3/2009 | Park et al. |
| 2018/0260019 A1* | 9/2018 | Kim ...................... G06F 1/3287 |
| 2019/0069244 A1* | 2/2019 | Jeon .................. H04W 52/0274 |
| 2019/0146574 A1* | 5/2019 | Jung ..................... G06F 1/3287 |
| | | 713/323 |
| 2020/0264727 A1* | 8/2020 | Lee ......................... G06F 3/044 |
| 2021/0160783 A1 | 5/2021 | Park et al. |
| 2022/0415241 A1 | 12/2022 | Yoon |
| 2023/0083400 A1 | 3/2023 | Huang et al. |

FOREIGN PATENT DOCUMENTS

| | | | | |
|---|---|---|---|---|
| KR | 20090021816 A | | 3/2009 | |
| KR | 20170047060 A | * | 5/2017 | ........ H04M 1/72522 |
| KR | 20170067355 A | | 6/2017 | |
| KR | 102152728 B1 | | 9/2020 | |
| KR | 20220087251 A | | 6/2022 | |
| KR | 20230000557 A | | 1/2023 | |
| WO | 2023087334 A1 | | 5/2023 | |

\* cited by examiner

METHOD FOR CONTROLLING POWER AND ELECTRONIC DEVICE SUPPORTING THE SAME

CROSS-REFERENCE TO RELATED APPLICATION

This application is a continuation of International Application No. PCT/KR2024/001529, designating the United States, filed on Feb. 1, 2024, in the Korean Intellectual Property Receiving Office and claiming priority to Korean Patent Application No. 10-2023-0080881, filed on Jun. 23, 2023, in the Korean Intellectual Property Office and Korean Patent Application No. 10-2023-0105784, filed on Aug. 11, 2023, in the Korean Intellectual Property Office, the disclosures of which are incorporated by reference herein in their entireties.

TECHNICAL FIELD

The present disclosure relates to a method for controlling power and an electronic device supporting the same.

BACKGROUND ART

An electronic device may be configured to power on using a physical key (or hardware key) (e.g., a key including a tact dome switch) exposed to an outside of the electronic device. For example, the electronic device may obtain, from a user, an input of pressing (or touching) a physical key exposed to the outside of the electronic device. The electronic device may supply, based on the obtained input, power from a battery to a power management module (e.g., a power management integrated circuit (PMIC)).

The power management module may transfer power supplied from the battery to one or more components (e.g., a processor) included in the electronic device. The processor may perform a booting operation in an active state so that the electronic device performs an operation.

DETAILED DESCRIPTION OF THE INVENTION

Technical Solution

Recently, attempts have been made to replace a physical key exposed to the outside of the electronic device with a virtual key (or a software key) displayed through a display of the electronic device. For example, in the electronic device, a home key for performing a designated function while the electronic device is in a power on state may be implemented as the virtual key instead of the physical key.

On the other hand, in the case of a physical power key for powering on an electronic device, it may be difficult to replace the virtual key displayed on the display when the electronic device is powered on, because a user input on the physical power key is obtained while the electronic device is powered off.

Technical Solution

The present disclosure relates to a method of controlling power and an electronic device supporting the same by powering on the electronic device using a sensor (e.g., a touch sensor) so that the electronic device does not include a physical power key.

The technical problems to be achieved by the present disclosure are not limited to the above mentioned technical problems, and other technical problems not mentioned can be clearly understood by those skilled in the art to which the present disclosure belongs from the following description.

An electronic device according to an embodiment may include a touch input unit, a first PMIC, a battery, a first switching circuit, and a battery controller. The battery controller may be configured to control the first switching circuit such that power is supplied from the battery to the touch input unit and no power is supplied from the battery to the first PMIC. The battery controller may be configured to obtain an input through the touch input unit 230 while power is supplied from the battery to the touch input unit and no power is supplied from the battery to the first PMIC. The battery controller may be configured to control the first switching circuit such that power is supplied from the battery to the first PMIC based on obtaining the input.

A method for controlling power in an electronic device according to an embodiment, may comprise controlling, by a battery controller of the electronic device, a first switching circuit of the electronic device such that power is supplied from a battery of the electronic device to a touch input unit of the electronic device and no power is supplied from the battery to the first PMIC. The method may comprise while power is supplied from the battery 271 to the touch input unit and no power is supplied from the battery to the first PMIC, obtaining, by the battery controller, an input through the touch input unit 230. The method may comprise controlling, by the battery controller, based on obtaining the input, the first switching circuit such that power is supplied from the battery to the first PMIC.

A non-transitory computer-readable medium storing computer-executable instructions according to an embodiment, wherein the computer-executable instructions, when executed by a battery controller, cause an electronic device to control a first switching circuit of the electronic device such that power is supplied from a battery of the electronic device to a touch input unit of the electronic device and no power is supplied from the battery to the first PMIC. The computer-executable instructions, when executed by the battery controller, cause the electronic device to while power is supplied from the battery to the touch input unit and no power is supplied from the battery to the first PMIC, obtain, an input through the touch input unit. The computer-executable instructions, when executed by the battery controller, cause the electronic device to control, based on obtaining the input, the first switching circuit such that power is supplied from the battery to the first PMIC.

An electronic device according to an embodiment may comprise a sensor, a first PMIC configured to manage power supplied to electrical components of the electronic device, a battery, a first switching circuit, and a battery controller. The battery controller may be configured to control the first switching circuit such that power is supplied from the battery to the touch input unit while the electronic device is in a power off state. The battery controller may be configured to obtain a designated input for powering on the electronic device through the sensor. The battery controller may be configured to control, based on the designated input, the first switching circuit such that power is supplied from the battery to the first PMIC.

A method for controlling power and an electronic device supporting the same according to an embodiment of the present disclosure can prevent the electronic device from including a physical power key by powering on the electronic device using a sensor (e.g., a touch sensor). Through this, the electronic device can have an elegant design.

MODE FOR CARRYING OUT THE INVENTION

Figure 1:
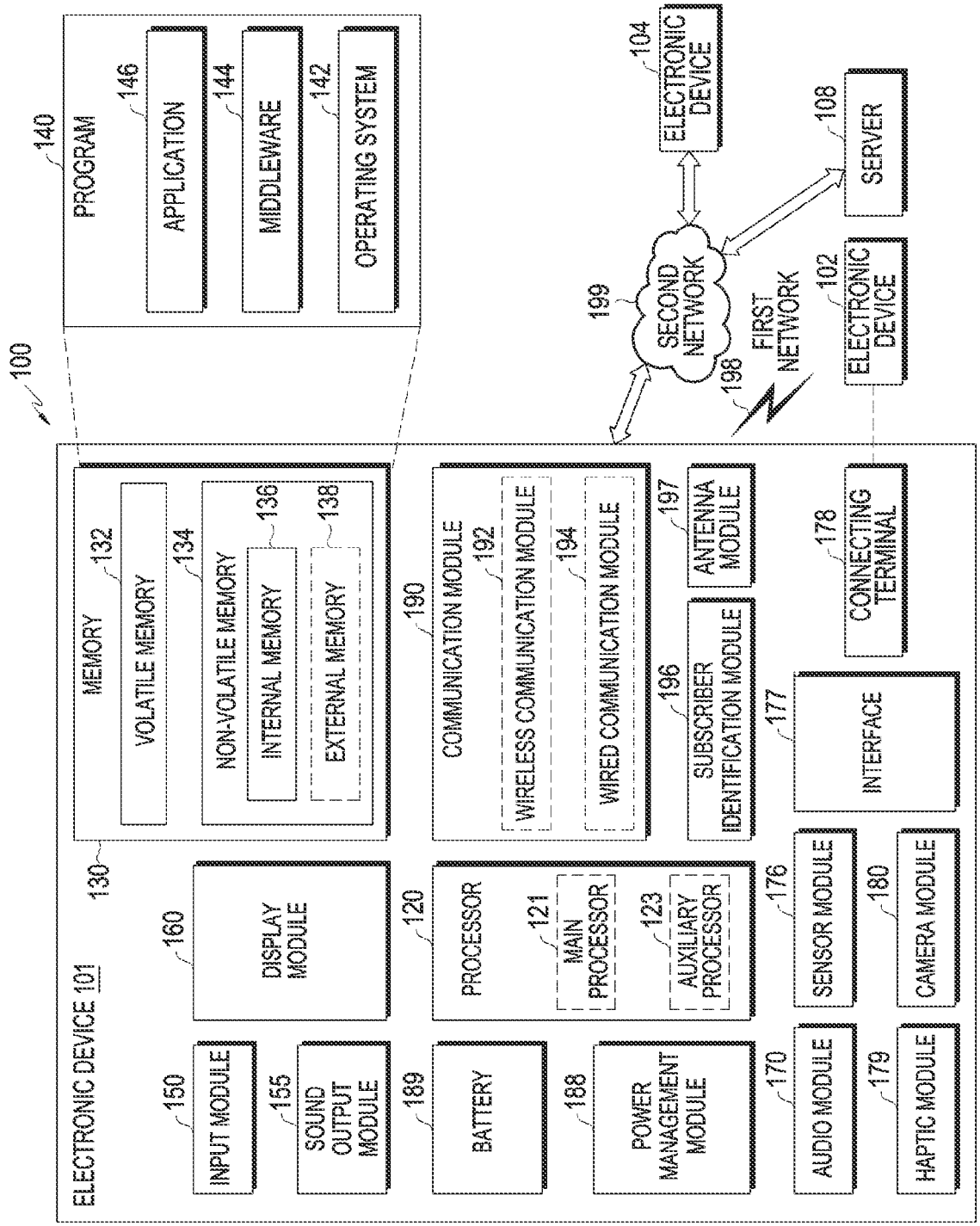
FIG. 1 is a block diagram illustrating an electronic device within a network environment according to an embodiment.

FIG. 1 is a block diagram illustrating an electronic device within a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to an embodiment of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
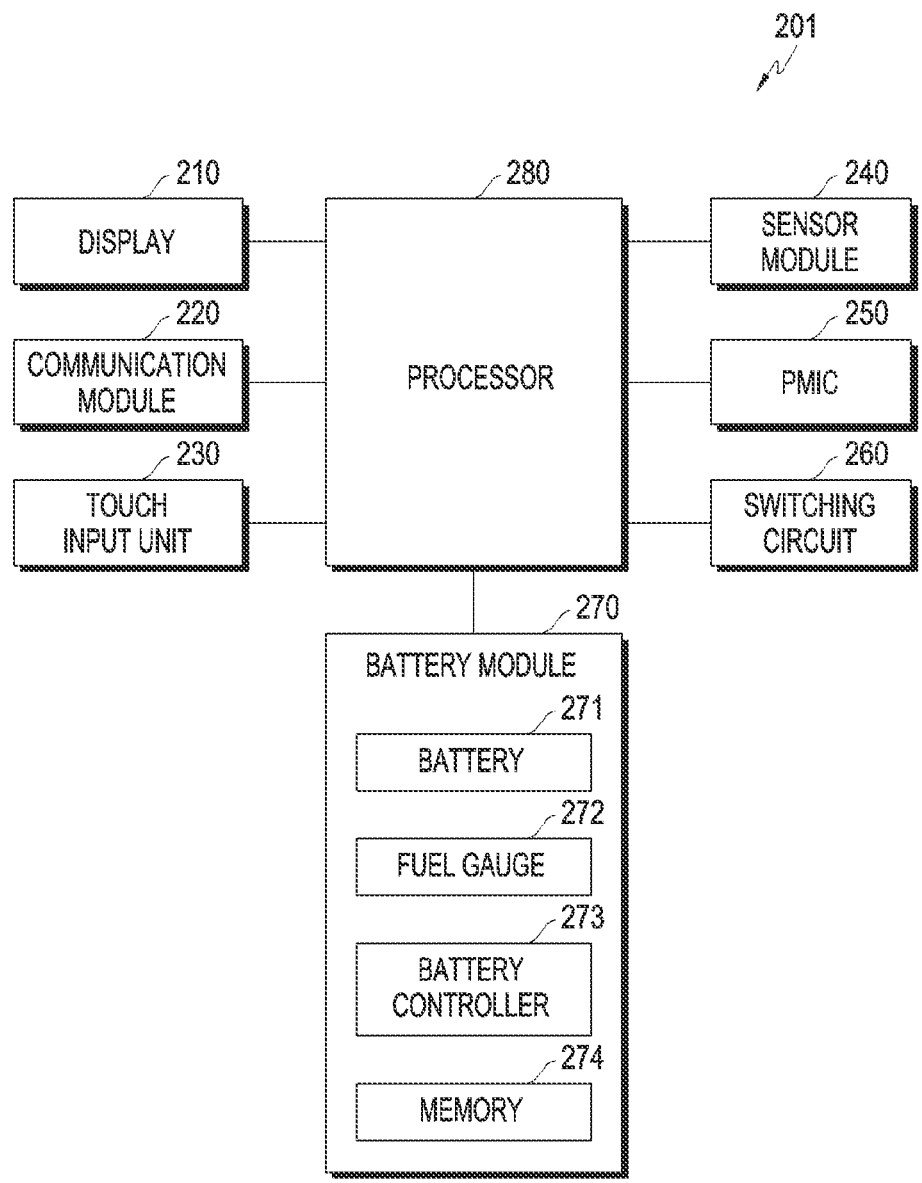
FIG. 2 is a block diagram of an electronic device according to an embodiment.

FIG. 2 is a block diagram of an electronic device 201 according to an embodiment.

Referring to FIG. 2, in an embodiment, the electronic device 201 may be the electronic device 101 of FIG. 1.

In an embodiment, the electronic device 201 may include a display 210, a communication module 220, a touch input unit 230, a sensor module 240, a PMIC 250, a switching circuit 260, and a battery module 270, and/or a processor 280.

In an embodiment, display 210 may be a display module 160 of FIG. 1.

In an embodiment, display 210 may be a flexible display. For example, the display 210 may be a foldable, bendable, or rollable display. However, it is not limited thereto, and the display 210 may be implemented in a flat form.

In an embodiment, a communication module 220 may be the communication module 190 of FIG. 1.

In an embodiment, the communication module 220 may wirelessly (or wiredly) connect the electronic device 201 and an external electronic device (e.g., a wearable electronic device). In an embodiment, the communication module 220 may receive, from an external electronic device, a designated signal (e.g., a signal including a command that cause the electronic device 201 to perform an operation for powering on the electronic device 201) that causes the electronic device 201 to an operation for powering on the electronic device 201.

In an embodiment, the touch input unit 230 may obtain (e.g., detect) a touch input inputted from a user. In an embodiment, the touch input unit 230 may include a touch IC 231 (integrated circuit) (also referred to as "touch controller") and a touch panel 232 (also referred to as "touch sensor" or "touch pad") (refer to FIG. 3).

In an embodiment, the touch input unit 230 may obtain a designated input for powering on the electronic device 201. For example, the touch input unit 230 may obtain a touch input inputted for a designated time (or more than the designated time) and/or a touch input inputted a designated number of times (e.g., twice or three times) such that the electronic device 201 performs the operation for powering on the electronic device 201. However, it is not limited thereto. For example, the touch input unit 230 may obtain a touch input having a designated pattern (e.g., a touch input drawing a letter "P", or any other letter and/or symbol as the designated pattern) such that the electronic device 201 performs the operation for powering on the electronic device 201.

In an embodiment, the touch input unit 230 may be disposed on a side of the electronic device 201. However, the location where the touch input unit 230 in the electronic device 201 is disposed is not limited to the side of the electronic device 201, and the location where the touch input unit 230 is disposed will be described in detail later.

In an embodiment, the touch input unit 230 may be a component capable of replacing a power key. For example, the touch input unit 230 may be a component which is capable of replacing a physical key (or hardware key) (e.g., a key including a tact dome switch) mapped to a function for powering on the electronic device 201. For example, the touch input unit 230 may be configured to detect an input for powering on the electronic device 201 in place of a conventional power key.

In an embodiment, the sensor module 240 may be the sensor module 176 of FIG. 1.

In an embodiment, the sensor module 240 may obtain a designated input for powering on the electronic device 201. For example, an ultrasonic sensor may detect, using ultrasonic waves, a touch or a proximity of a user to a portion (e.g., a side of the electronic device 201) of the electronic device 201 where the ultrasonic sensor is disposed, the touch or the proximity of the user causing the electronic device 201 to perform the operation for powering on the electronic device 201. For example, a sensor using an optical method (e.g., a proximity sensor) may detect an object, based on an amount of a light incident to a light receiver (e.g., photodiode) after the light (e.g., infrared light) emitted from the emitter is reflected by an object. The sensor using an optical method may detect proximity of a user to the sensor using the optical method, the proximity of the user causing the electronic device 201 to perform the operation for powering on the electronic device 201. For example, a capacitive sensor may be, through a capacitive coupling effect, a sensor capable of sensing a change in proximity, displacement, humidity, a flow rate, and/or acceleration. The capacitive sensor may detect a touch or proximity of a user to a portion of the electronic device 201 where the capacitive sensor is disposed (e.g., a side of the electronic device 201). For example, a piezo sensor may be a sensor capable of generating a voltage by a polarization phenomenon (e.g., a change in electric dipole distribution) caused by mechanical deformation (e.g., deformation of a material by tension or pressure) or generating a mechanical strain (or force) by deforming the microstructure of a material by applying a voltage. The piezo sensor may detect a user input to the piezo sensor (e.g., force or pressure applied by the user). For example, a pressure type sensor may be a sensor capable of detecting a pressure based on a resistance change obtained using a strain gauge (e.g., a wheatstone bridge circuit). However, the principle of the pressure type sensor is not limited to the above example. The pressure-type sensor may detect a user input (e.g., pressure) to the pressure-type sensor.

However, the sensor included in the sensor module 240 capable of obtaining a designated input for powering on the electronic device 201 is not limited to the above examples.

In an embodiment, sensor data obtained by the sensor module 240 may be provided to battery controller 273 (and/or processor 280) through GPIO (general purpose input output) after the sensor data is converted to high value (or "1" value) or low value (or "0" value). However, it is not limited thereto, and the sensor data obtained by the sensor module 240 is provided to the battery controller 273 (and/or processor 280), and then may be processed by the battery controller 273 (and/or the processor (280)).

Figure 3:
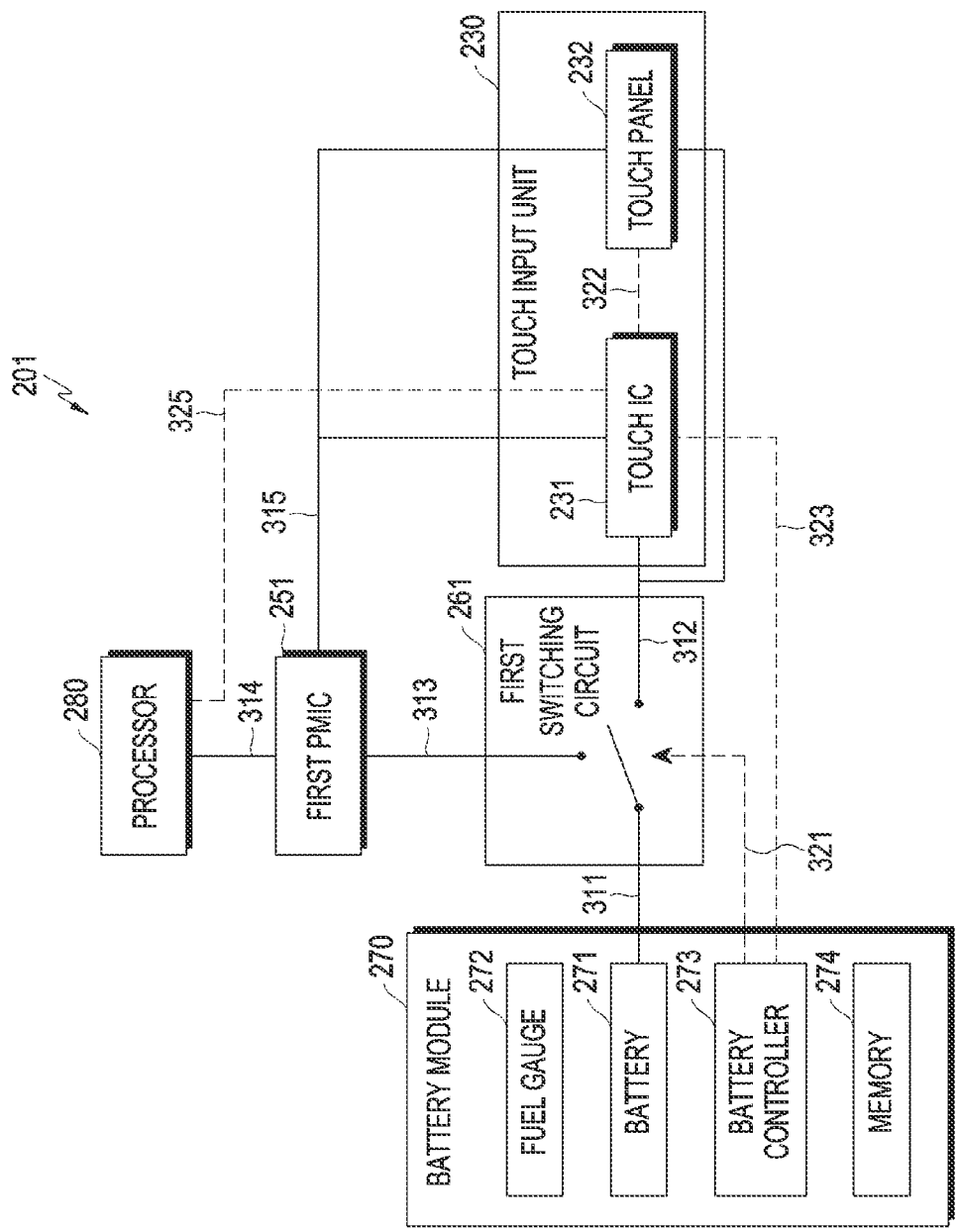
FIG. 3 is a diagram illustrating an electronic device according to an embodiment.

In an embodiment, the PMIC 250 (power management IC) may include a first PMIC (e.g., the first PMIC 251) (refer to FIG. 3).

In an embodiment, the first PMIC 251 may manage power of the electronic device 201. For example, the first PMIC 251 may be configured to manage power supplied to electric components (e.g., the processor (280), the display module (160), the touch input unit (230)) of the electronic device 201. For example, the first PMIC 251 may manage power supplied from the battery 271 (or an external power device supplying power to the electronic device 201, or a device capable of charging the electronic device 201). For example, the first PMIC 251 may perform an operation of distributing power required by each component of the electronic device 201 from the battery 271 to each component of the electronic device 201, an operation of converting (e.g., rectifying) a voltage and/or a current of power supplied from the battery 271 into a voltage and/or a current required by each component of the electronic device 201, an operation of controlling power supplied from the battery 271, and/or an operation of charging the battery 271. However, the operations performed by the first PMIC 251 are not limited to the above examples. For example, the first PMIC 251 may perform at least a part of an operation performed by a fuel gauge 272 (e.g., an operation of measuring a voltage of the battery 271), which will be described later.

In an embodiment, the PMIC 250 may further include a second PMIC (e.g., the second PMIC 252) in addition to the first PMIC 251. The second PMIC 252 may manage, while the electronic device 201 is powered off, power supplied to the touch input unit 230 performing an operation of obtaining (or receiving) a designated input (or designated signal) for powering on the electronic device 201 and/or the sensor module 240 (or the communication module 220).

In an embodiment, the switching circuit 260 may include a first switching circuit (e.g., the first switching circuit 261) (refer to FIG. 3).

In an embodiment, the first switching circuit may switch power supplied from the battery 271.

In an embodiment, the first switching circuit may be connected to the battery 271, the first PMIC 251, and the touch input unit 230 (or sensor or communication module 220). For example, the first switching circuit may perform a switching operation, such that the battery 271 and the touch input unit 230 are connected, or the battery 271 and the first PMIC 251 are connected.

In an embodiment, the switching circuit 260 may include a second switching circuit (e.g., the second switching circuit 262) in addition to the first switching circuit. The second switching circuit may connect or disconnect the first PMIC 251 and the second PMIC (e.g., the second PMIC 252) by a switching operation (refer to FIG. 4).

In an embodiment, a battery module 270 (also referred to as a "battery pack") may include battery 271 (e.g., battery cells), fuel gauge 272 (fuel gauge), a battery controller 273, and/or memory 274.

In an embodiment, the battery 271 may supply power to each component of the electronic device 201. In an embodiment, battery 271 may be a rechargeable battery. In an embodiment, the battery 271 may include a battery protection circuit (e.g., a protection circuit module (PCM)). The battery protection circuit may perform various functions to prevent performance degradation or a damage of the battery 271.

In an embodiment, the fuel gauge 272 may measure a voltage of battery 271. For example, the fuel gauge 272 may measure the voltage of the battery 271 from a positive terminal and a negative terminal (or ground) of the battery 271. For example, the fuel gauge 272 may measure a voltage of the battery 271 while power is supplied from the battery 271 to each component of the electronic device 201. In an embodiment, the fuel gauge 272 may identify, based on the measured voltage of the battery 271, a capacity of the battery 271 (e.g., a current remaining capacity of the battery 271). However, the function performed by the fuel gauge 272 is not limited to the above examples. For example, the fuel gauge 272 may measure the number of charge/discharge times of the battery 271 and/or a temperature of the battery 271.

In an embodiment, the battery controller 273 may control power supplied from the battery 271.

In an embodiment, the battery controller 273 may control, using power supplied from a charging device, an operation of charging the battery 271. For example, the battery controller 273 may control, based on the capacity of the battery 271 measured by the fuel gauge 272, a speed charging the battery 271. The battery controller 273 may adjust the speed charging the battery 271 such that the battery 271 is charged at a first charging rate when the capacity of the battery 271 is equal to or less than a designated capacity, and the battery 271 is charged at a second charging rate slower than the first charging rate when the capacity of the battery 271 exceeds the designated capacity. However, the operation of controlling the operation of the battery controller 273 to charge the battery 271 is not limited to the above examples.

In an embodiment, the battery controller 273 may be in an activated state while the electronic device 201 is in a powered off state. For example, the battery controller 273 may maintain an activated state using power supplied from the battery 271 while the electronic device 201 is in the power off state. In an embodiment, the battery controller 273 may identify, while the electronic device 201 is in the power off state, whether the designated input for powering on (201) is obtained through the touch input unit 230 (or the sensor module 240, or the communication module 220).

In an embodiment, the battery controller 273 may control, based on the designated input being obtained, the switching operation of the first switching circuit (and the second switching circuit).

In an embodiment, the battery controller 273 may be deactivated, after controlling the operation of the first switching circuit such that power is supplied from battery 271 to the first PMIC 251 (or after processor 280 is changed from a deactivated state to an activated state). For example, battery controller 273 may, based on obtaining a designated input for powering on electronic device 201, control the operation of the first switching circuit such that power is supplied from battery 271 to the first PMIC 251. The first PMIC 251 may supply power to the processor 280 if power is supplied to the first PMIC 251. The processor 280 may be changed from the deactivated state to the activated state, based on power being supplied from the first PMIC 251. In an embodiment, if the battery controller 273 is deactivated, the first PMIC 251 may perform at least a portion of the operation performed by the fuel gauge 272, and the processor 280 may perform the at least portion of the operation performed by the battery controller 273. In an embodiment, while the battery controller 273 is in the deactivated state, the battery controller 273 may be changed to the activated state, based on a control signal received from the processor 280.

In an embodiment, battery controller 273 may provide, based on the designated input being obtained, a signal to processor 280 (e.g., an application processor and/or communications processor), the signal is signal for activating the processor 280. For example, while the electronic device 201 is in the power off state, the processor 280 may be in the deactivated state. The battery controller 273 may provide, based on the designated input being obtained while the electronic device 201 is in the power off state, wake-up signal to the processor 280 such that the processor 280 is changed from the deactivated to the activated state.

In an embodiment, the battery controller 273 may be deactivated after providing, to the processor 280, the signal for activating the processor 280. For example, the battery controller 273 may enter the deactivated state after providing, to the processor 280, the signal for activating the processor 280. For example, the battery controller 273 may enter the deactivated state based on a control signal received from the activated processor 280, after providing, to the processor 280, the signal for activating the processor 280. In an embodiment, the battery controller 273 may be changed to the activated state, based on a control signal received from the processor 280 while in the deactivated state. For example, the processor 280 may obtain an input for powering off the electronic device 201 while the electronic device 201 is in a power on state. The processor 280 may provide, based on an input for powering off the electronic device 201, a control signal for activating the battery controller 273 which is in the deactivated state to the battery controller 273. The battery controller 273 may be changed, based on receiving the control signal received from the processor 280, from a deactivated state to the activated state. However, it is not limited thereto. For example, the battery controller 273 may maintain the activated state while the electronic device 201 is in the power off state and the power on state.

In an embodiment, the battery controller 273 may be a micro controller unit (MCU) that can perform various controls or calculation tasks through programming. In an embodiment, in FIG. 2, the battery controller 273 is shown as being included in the battery module 270 (battery pack), but the present invention is not limited thereto. For example, the battery controller 273 may be disposed on the same circuit board as a circuit board on which other components included in the battery module 270 are disposed, or a circuit board different from the circuit board on which other components included in the battery module 270 are placed (e.g., a main circuit board, a circuit board on which the PMIC 250 and/or the processor 280 are placed, printed board assembled (PBA)) circuit board). In an embodiment, the battery controller 273 may be formed integrally with the switching circuit 260 (e.g., the first switching circuit 261). For example, the battery controller 273 may include a switching circuit 260 (e.g., the first switching circuit 261). In an embodiment, the battery controller 273 may be included in a battery protection circuit (PCM) or a battery management system (BCM). For example, the battery controller 273 may be formed integrally with a battery protection integrated circuit (IC) or a battery monitoring integrated circuit (IC).

In an embodiment, the memory 274 may be memory 130 of FIG. 1.

In an embodiment, the memory 274 may be non-volatile memory (e.g., flash memory) that can maintain information stored in memory 274 even when power is not supplied from battery 271.

In an embodiment, the memory 274 may store information necessary for the battery controller 273 to perform an operation. For example, memory 274 may store information necessary for the battery controller 273 to determine whether the designated input for powering on the electronic device 201 is obtained, information necessary for the battery controller 273 to control the switching operation of the first switching circuit (and the second switching circuit), and/or information necessary for the battery controller 273 to control the operation of charging the battery 271.

In an embodiment, the processor 280 may be the processor 120 of FIG. 1. In an embodiment, the processor 280 may include one or more processors for controlling the operation of the electronic device 201.

In an embodiment, the processor 280 may receive power from the first PMIC 251 when power is supplied to the first PMIC 251 from the battery 271. The processor 280 may be changed from the deactivated state to the activated state, based on power being supplied to the first PMIC 251. For example, processor 280 may wake up in response to power being supplied to the first PMIC 251.

In an embodiment, the processor 280 may perform an operation of booting the electronic device 201 after the processor 280 is changed from the deactivated state to the activated state.

In an embodiment, the processor 280 may obtain an input for powering off the electronic device 201 while the electronic device 201 is in a power on state. The processor 280 may cause the electronic device 201 to be powered off based on the obtained input. For example, the processor 280 may display, through the display 210, an object (e.g., an icon) mapped to a function for powering off the electronic device 201 while the electronic device 201 is in the power on state. The processor 280 may perform an operation for powering off the electronic device 201 based on a user input for the object. However, the input for powering off the electronic device 201 is not limited to the above-described examples.

For example, the processor 280 may power off the electronic device 201 based on a user input (e.g., an input of touching the touch input unit 230 for a designated time and/or an input of touching the touch input unit 230 a designated times) on the touch input unit 230 while the electronic device is in the power on state.

In FIG. 2, the electronic device 201 may include the display 210, the communication module 220, the touch input unit 230, the sensor module 240, a PMIC 250, the switching circuit 260, the battery module 270, and/or the processor 280, but is not limited thereto. For example, the electronic device 201 may further include one or more components included in the electronic device 201 of FIG. 1. The electronic device 201 may not include at least one of the components shown in FIG. 2.

Hereinafter, with reference to FIGS. 3 and 4, the operation of controlling power to electronic device 201 will be described in more detail.

FIG. 3 is a diagram illustrating an electronic device 201 according to an embodiment.

Referring to FIG. 3, in an embodiment, the electronic device 201 may include a touch input unit 230, a first PMIC 251, a first switching circuit 261, a battery module 270, and/or a processor 280.

In an embodiment, the touch input unit 230 may include a touch IC 231 and a touch panel 232.

In an embodiment, the battery module 270 may include a battery 271, a fuel gauge 272, a battery controller 273, and/or memory 274.

Hereinafter, a state of the electronic device 201 in which power is supplied from the battery 271 to the touch input unit 230 (or the sensor 241, or the communication module 220) and no power is supplied from the battery 271 to the first PMIC 251 is referred as "power off state". In an embodiment, in the power off state, the battery 271 may be connected to the touch input unit 230 through the first switching circuit 261. In an embodiment, in the power off state, power may be not supplied from the battery 271 to the electrical components of the electronic device 201 through the first PMIC 251 (e.g., remaining electrical components other than the battery controller 273 and the touch input unit 230 among the electrical components of the electronic device 201).

Further, hereinafter, a state of the electronic device 201 in which power is supplied from the battery 271 to the first PMIC 251 is referred as "power on state". In an embodiment, in the power on state, the battery 271 may be connected to the first PMIC 251 through the first switching circuit 261. In an embodiment, based on power being supplied from the battery 271 to the first PMIC 251, power is supplied from the battery 271 to the electrical components of the electronic device 201.

Further, hereinafter, an operation changing the electronic device 201 from the power on state to the power off state is referred as "power off", and an operation changing the electronic device 201 from the power off state to the power on state is referred as "power on".

In an embodiment, the battery controller 273 may control the first switching circuit 261 such that the electronic device 201 is in the power off state in which the battery 271 and the touch input unit 230 are connected and the battery 271 and the first PMIC 251 are not connected. For example, the battery controller 273 may control the first switching circuit 261 such that power is supplied from the battery 271 to the touch IC 231 and the touch panel 232 (e.g., the lines 311 and 312 are connected through the first switching circuit 261).

In an embodiment, the battery controller 273 may control the first switching circuit 261 such that power is supplied from the battery 271 to at least a portion of the touch panel 232 and the touch IC 231 while the electronic device 201 is in the power off state. For example, a size of an entire area of the touch panel 232 may be substantially the same as a size of an entire area of the display 210. A portion area of the entire area of the touch panel 232 may be designated (e.g., set) to obtain (e.g., detect) a designated input for powering on the electronic device 201. The battery controller 273 may control the first switching circuit 261 such that power is supplied from the battery 271 to only the portion area with the touch IC 231 while the electronic device 201 is in the power off state, the portion area of the entire area of the touch panel 232 being designated to obtain the designated input for powering on the electronic device 201. Through this, a power consumption of the electronic device 201 can be reduced. However, it is not limited thereto. For example, the battery controller 273 may control the first switching circuit 261 such that power is supplied from the battery 271 to the entire area of the touch panel 232 and the touch IC 231 while the electronic device 201 is in the power off state.

In an embodiment, the battery controller 273 may obtain a designated input for powering on the electronic device 201 through the touch input unit 230 while the electronic device 201 is in the power off state. For example, the touch panel 232 may detect (e.g., sense) a touch input of a user (or hovering input). The touch panel 232 may provide the touch input to the touch IC 231 through the line 322. The touch IC 231 may provide the touch input to the battery controller 273 through the line 323 (e.g., using inter integrated circuit (I2C) communication). The battery controller 273 may obtain a designated input for powering on the electronic device 201 by identifying whether the touch input received from the touch IC 231 is a designated input for powering on the electronic device 201.

In an embodiment, the designated input for powering on the electronic device 201 may include a touch input inputted to the touch panel 232 for a designated time (or more than a designated time). In an embodiment, the designated input for powering on the electronic device 201 may include a touch input inputted to the touch panel 232 by a designated number of times (e.g., twice). However, the designated input for powering on the electronic device 201 is not limited to the above-described examples. For example, the designated input for powering on the electronic device 201 may include a touch input with a designated pattern (e.g., a touch input drawing the letter "P" as a designated pattern).

In an embodiment, the battery controller 273 may control, based on obtaining the designated input for powering on the electronic device 201, the first switching circuit 261 such that power is supplied from the battery 271 to the first PMIC 251. For example, the battery controller 273 may provide, based on obtaining the designated input for powering on the electronic device 201, a control signal to the first switching circuit 261 through the line 321 such that the battery 271 and the first PMIC 251 are connected (e.g., such that the line 311 and the line 313 are connected via the first switching circuit 261).

In an embodiment, if power is supplied from the battery 271 to the first PMIC 251, the first PMIC 251 may supply power to the processor 280 and the touch input unit 230. For example, the first PMIC 251 may supply power to the processor 280 through the line 314 and supply power to the touch IC 231 and the touch panel 232 through the line 315. Although not shown in FIG. 3, in an embodiment, the first PMIC 251 may supply power to components (e.g., display 210, the sensor module 240, and/or the communication module 220) included in the electronic device 201 in addition to the processor 280 and the touch input unit 230.

In an embodiment, the processor 280 may be changed from a deactivated state to an activated state, based on power being supplied from the first PMIC 251. If the processor 280 is activated, the processor 280 may perform communication with the touch IC 231 through the line 325. Although not shown in FIG. 3, in an embodiment, the processor 280 may perform communication with the battery controller 273 through a line (not shown).

In an embodiment, the processor 280 may perform an operation of booting the electronic device 201 after the processor 280 is changed from the deactivated state to the activated state.

Figure 4:
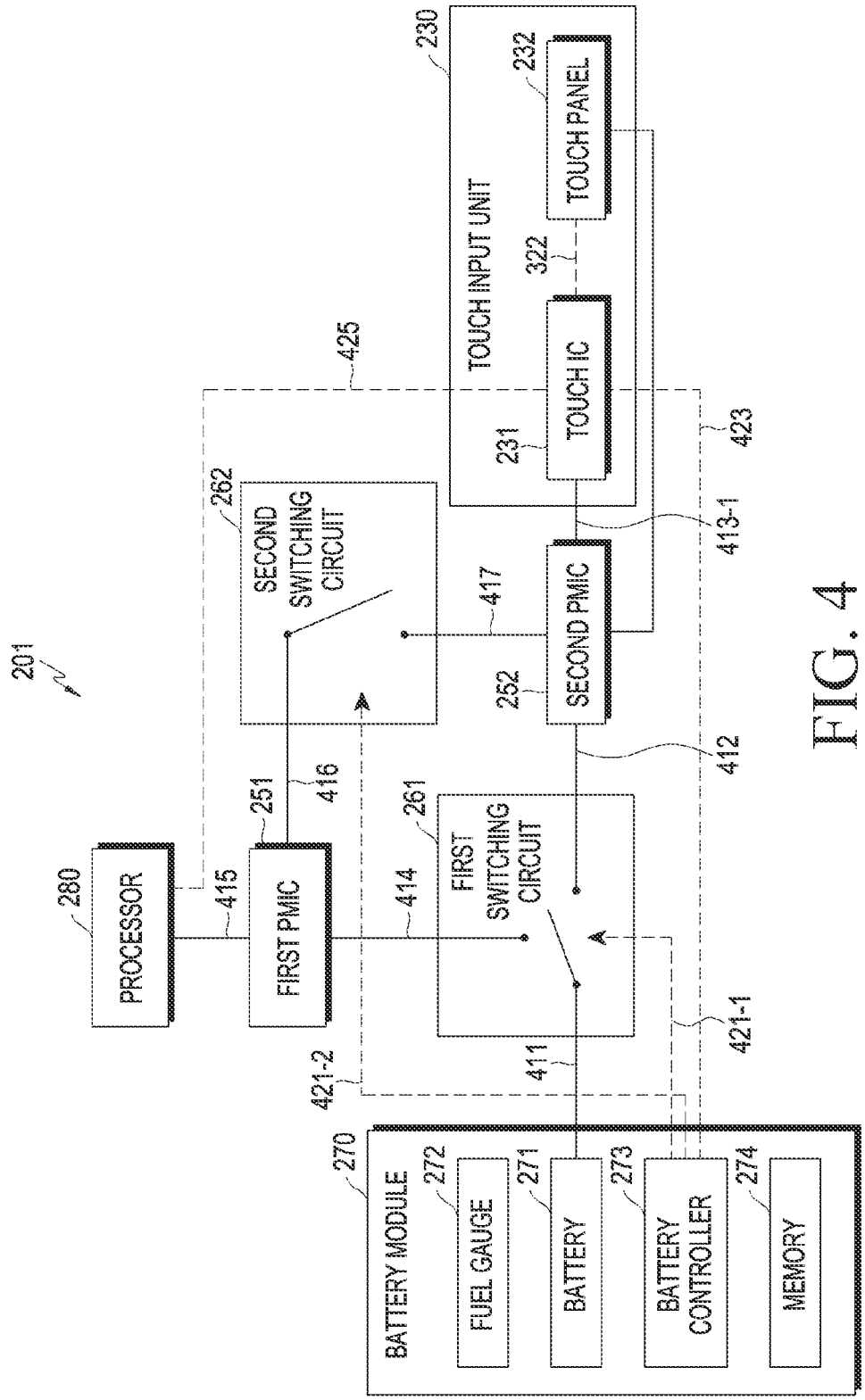
FIG. 4 is a diagram illustrating an electronic device according to an embodiment.

FIG. 4 is a diagram illustrating an electronic device 201 according to an embodiment.

Referring to FIG. 4, in an embodiment, the electronic device 201 may include a touch input unit 230, a first PMIC 251, a second PMIC 252, a first switching circuit 261, a second switching circuit 262, a battery module 270, and/or a processor 280.

In an embodiment, the touch input unit 230 may include a touch IC 231 and a touch panel 232.

In an embodiment, the battery module 270 may include a battery 271, a fuel gauge 272, a battery controller 273, and/or memory 274.

In an embodiment, the battery controller 273 may control the first switching circuit 261 and the second switching circuit 262 such that the battery 271 and the second PMIC 252 are connected and the first PMIC 251 and the second PMIC 252 are not connected while the electronic device 201 is in the power off state. For example, the battery controller 273 may control the first switching circuit 261 such that power is supplied from the battery 271 to the second PMIC 252 (e.g., such that the line 411 and the line 412 are connected through the first switching circuit 261) while the electronic device 201 is in the power off state. The battery controller 273 may control the second switching circuit 262 such that the second switching circuit 262 connected to the first PMIC 251 and the second PMIC 252 is in an open state (e.g., such that the lines 416 and/or the 417 are not connected) while the electronic device 201 is in the power off state.

In an embodiment, the second PMIC 252 may manage the power supplied from the battery 271 to the touch input unit 230 (e.g., provide power, distribute power, and/or convert a voltage and/or a current). For example, the second PMIC 252 may provide power required by the touch IC 231 and the touch panel 232 to the touch IC 231 through the lines 413-1 and 413-2.

In an embodiment, the battery controller 273 may obtain a designated input for powering on the electronic device 201 through the touch input unit 230 while the electronic device 201 is in the power off state.

In an embodiment, a designated input for powering on the electronic device 201 may include a touch input inputted for a designated time (or more than a designated time). In an embodiment, a designated input for powering on the electronic device 201 may include a touch input inputted by a designated number of times (e.g., twice). However, the designated input for powering on the electronic device 201 is not limited to the above-described examples. For example, a designated input for powering on the electronic device 201 may include a touch input with a designated pattern.

In an embodiment, the battery controller 273 may control, based on obtaining the designated input for powering on the electronic device 201, the first switching circuit 261 and the second switching circuit 262 such that power is supplied from the battery 271 to the first PMIC 251 and the power is supplied from the first PMIC 251 to the second PMIC 252. For example, the battery controller 273 may provide, based on obtaining the designated input for powering on the electronic device 201, a control signal to the first switching circuit 261 through the line 421-1 such that the battery 271 and the first PMIC 251 are connected (e.g., such that the line 411 and the line 414 are connected via first switching circuit 261). For example, the battery controller 273 may provide, based on obtaining the designated input for powering on the electronic device 201, a control signal to the second switching circuit 262 through the line 421-2 such that the first PMIC 251 and the second PMIC 252 are connected (e.g., such that the line 416 and the line 417 are connected via the second switching circuit 262).

In an embodiment, the first PMIC 251 may provide power to the second PMIC 252 through the second switching circuit 262 if the first PMIC 251 and the second PMIC 252 are connected. The second PMIC 252 may provide power to the touch input unit 230 based on the power supplied from the first PMIC 251.

In an embodiment, the first PMIC 251 may supply power to the processor 280 when power is supplied from the battery 271. For example, the first PMIC 251 may supply power to the processor 280 through the line 415. Although not shown in FIG. 4, in an embodiment, the first PMIC 251 may supply power to components (e.g., the display 210, the sensor module 240, and/or the communication module 220) included in the electronic device 201 in addition to the processor 280 and the second PMIC 252.

In an embodiment, the processor 280 may be changed from a deactivated state to an activated state based on power being supplied from the first PMIC 251. If the processor 280 is activated, the processor 280 may perform communication with the touch IC 231 through the line 425. Although not shown in FIG. 4, in an embodiment, the processor 280 may perform communication with the battery controller 273 through a line (not shown).

In an embodiment, the processor 280 may perform an operation of booting the electronic device 201 after the processor 280 is changed from the deactivated state to the activated state.

Figure 5:
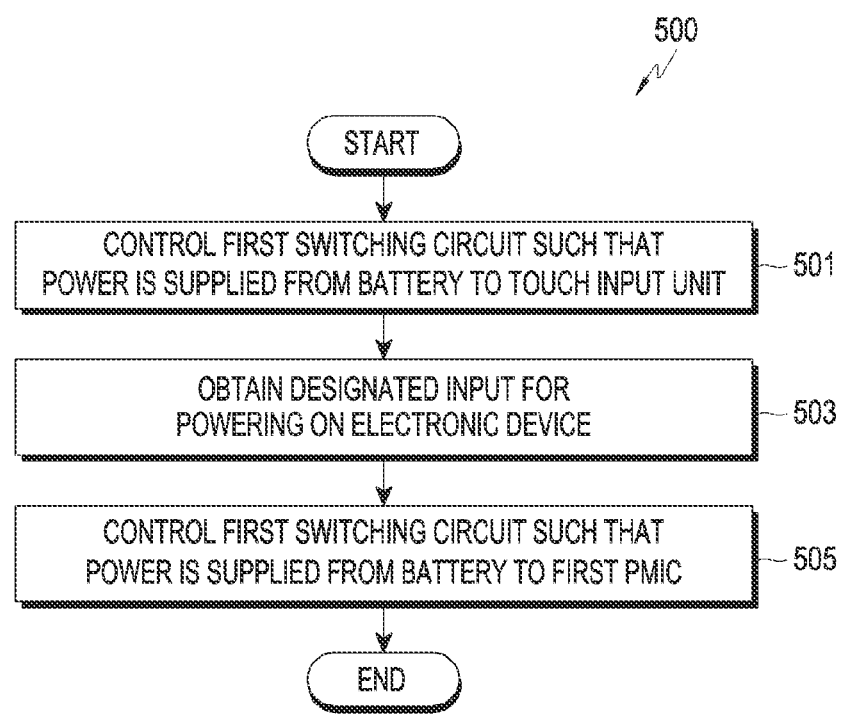
FIG. 5 is a flowchart illustrating a method of controlling power according to an embodiment.

FIG. 5 is a flowchart 500 illustrating a method of controlling power according to an embodiment.

Referring to FIG. 5, in operation 501, in an embodiment, the battery controller 273 may control the first switching circuit 261 such that power may be supplied from the battery 271 to the touch input unit 230 and no power is supplied from the battery 271 to the first PMIC 251 (e.g., such that the electronic device 201 is in the power off state). Hereinafter, operation 501 will be described with reference to FIG. 6A.

Figure 6A:
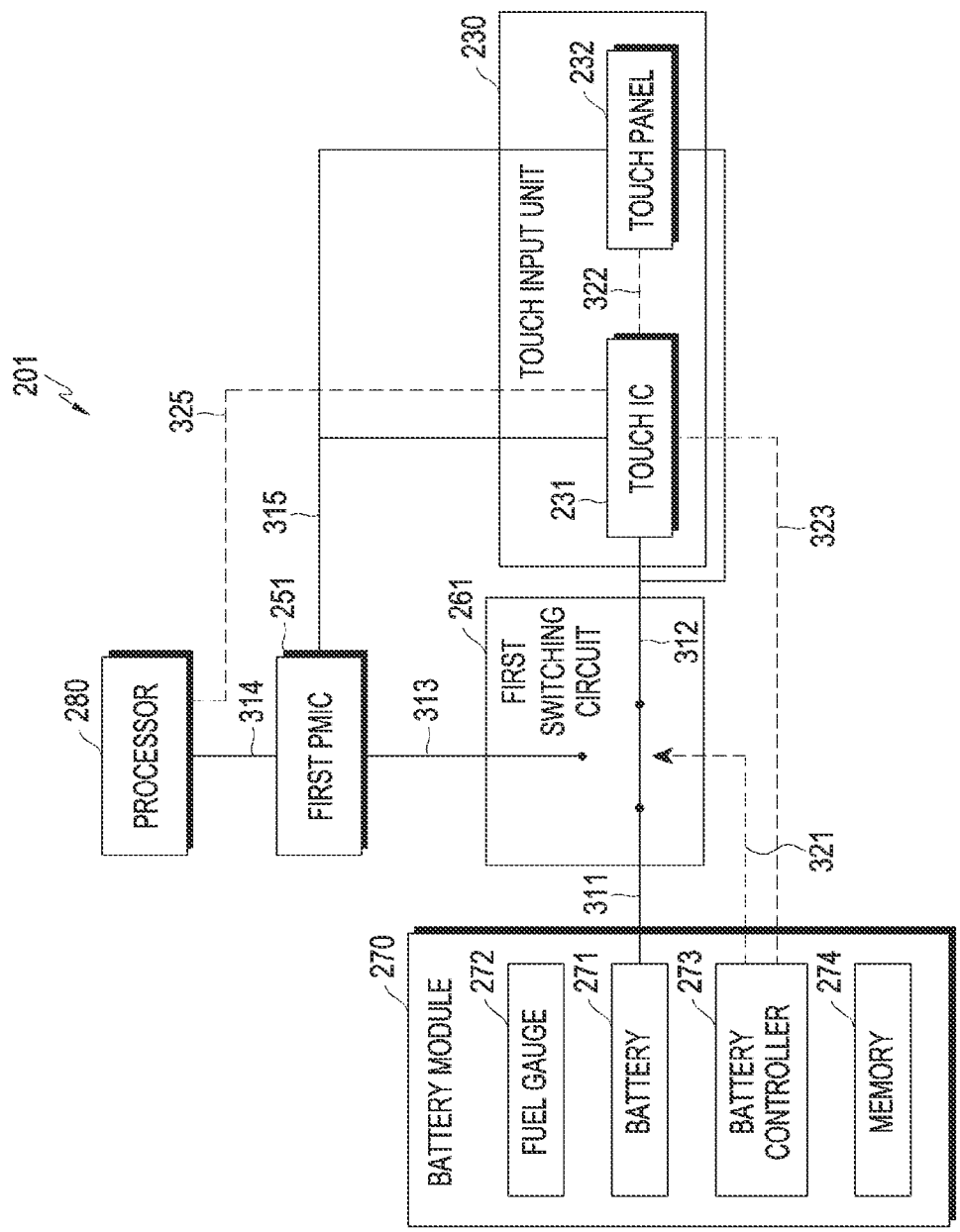
FIG. 6A is a diagram of illustrating an operation performed by an electronic device in a power off state according to an embodiment.

FIG. 6A is a diagram of illustrating an operation performed by an electronic device 201 in a power off state according to an embodiment.

Referring to FIG. 6A, in an embodiment, FIG. 6A may be substantially the same as FIG. 3 except for the switching state of the first switching circuit 261.

In an embodiment, the battery controller 273 may control the first switching circuit 261 such that the battery 271 and the touch input unit 230 are connected while the electronic device 201 is in the power off state. For example, as shown in FIG. 6A, the battery controller 273 may control the first switching circuit 261 such that the line 311 and the line 312 are connected through the first switching circuit 261 while the electronic device 201 is in the power off state. The battery controller 273 may supply power from the battery 271 to the touch IC 231 and the touch panel 232 after the line 311 and line 312 are connected through the first switching circuit 261.

In an embodiment, the battery controller 273 may control the first switching circuit such that power is supplied from the battery 271 to at least a portion area of the touch panel 232 and the touch IC 231 while the electronic device 201 is in the power off state. For example, the size of the entire area of the touch panel 232 may be substantially the same as the size of the entire area of the display 210. A portion area of areas may be designated (e.g., set) to obtain (e.g., detect) a designated input for powering on the electronic device 201. The battery controller 273 may control the first switching circuit 261 such that power is supplied from the battery 271 to only the portion area with the touch IC 231 while the electronic device 201 is in the power off state, the portion area of the entire area of the touch panel 232 being designated to obtain the designated input for powering on the electronic device 201. Through this, a power consumption of the electronic device 201 can be reduced. However, it is not limited thereto. For example, the battery controller 273 may control the first switching circuit 261 such that power is supplied from the battery 271 to the entire area of the touch panel 232 and the touch IC 231 while the electronic device 201 is in the power off state.

Referring back to FIG. 5, in operation 503, in an embodiment, the battery controller 273 may obtain a designated input for powering on the electronic device 201. For example, the battery controller 273 may obtain a designated input for powering on the electronic device 201 while the electronic device 201 is in the power off state.

In an embodiment, the designated input for powering on the electronic device 201 may include a touch input inputted for a designated time (or more than a designated time). In an embodiment, the designated input for powering on the electronic device 201 may obtain a touch input inputted by a designated number of times (e.g., twice). However, the designated input for powering on the electronic device 201 is not limited to the above-described examples. For example, the designated input for powering on the electronic device 201 may include a touch input with a designated pattern.

In operation 505, in an embodiment, the battery controller 273 may control, based on obtaining a designated input for powering on the electronic device 201, the switching circuit 261 such that power is supplied to the first PMIC 251 from the battery 271. Hereinafter, operation 505 will be described with reference to FIG. 6B.

Figure 6B:
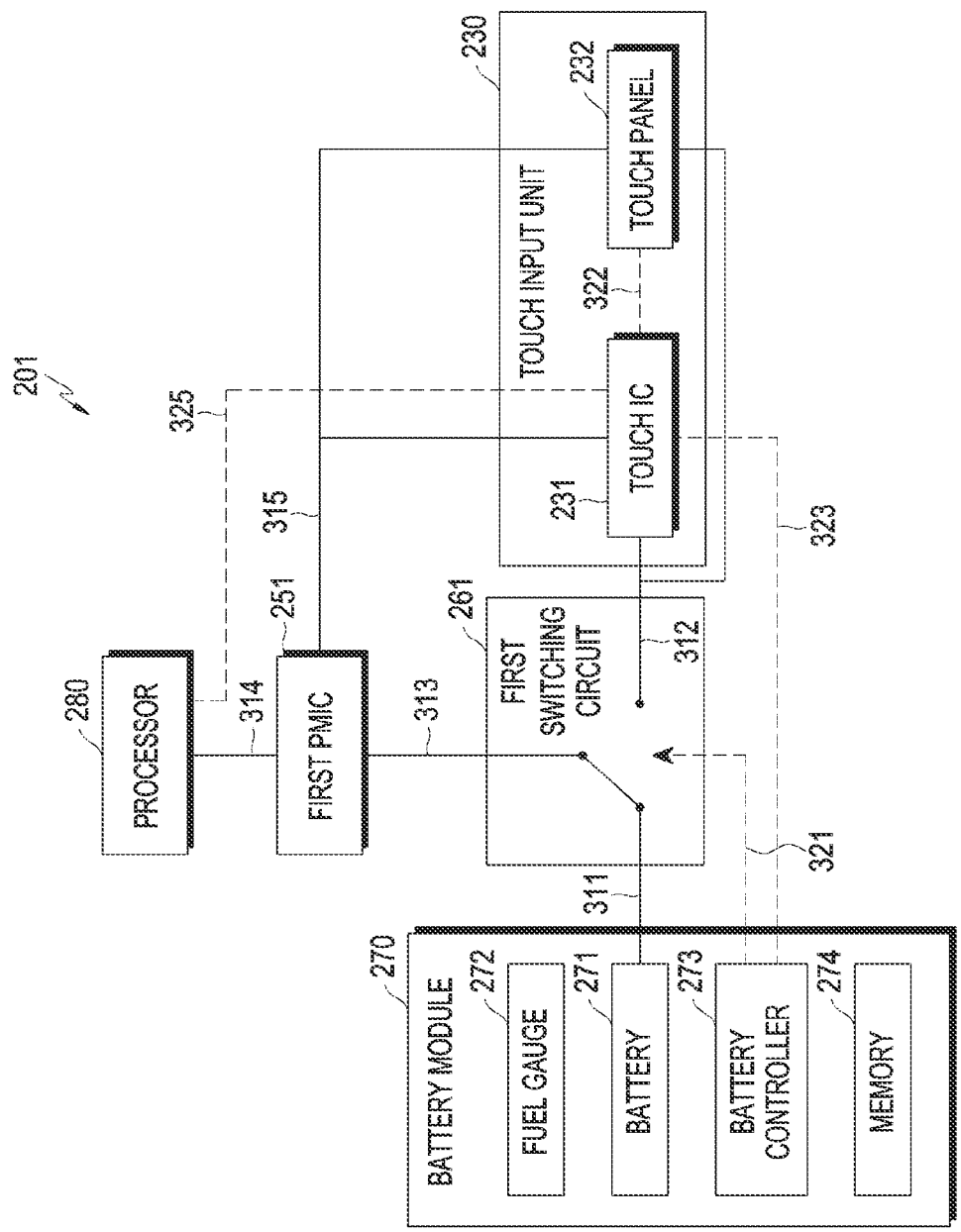
FIG. 6B is a diagram of illustrating an operation performed, based on obtaining a designated input for powering on an electronic device, by an electronic device according to an embodiment.

FIG. 6B is a diagram of illustrating an operation performed, based on obtaining a designated input for powering on an electronic device 201, by an electronic device according to an embodiment.

Referring to FIG. 6B, in an embodiment, FIG. 6B may be substantially the same as FIG. 3, except for the switching state of the first switching circuit 261.

In an embodiment, the battery controller 273 may control, based on obtaining the designated input for powering on the electronic device 201, the first switching circuit 261 such that power is supplied from the battery 271 to the first PMIC 251. For example, the battery controller 273 may provide, based on obtaining the designated input for powering on the electronic device 201, a control signal to the first switching circuit 261 through the line 321 such that the line 311 and the line 313 are connected through the first switching circuit 261. By connecting the line 311 and line 313 through the first switching circuit 261, power can be supplied from the battery 271 to the first PMIC 251.

In an embodiment, if power is supplied from the battery 271 to, the first PMIC 251, the first PMIC 251 may supply power to the processor 280 and the touch input unit 230. For example, the first PMIC 251 may supply power to the processor 280 through the line 314 and to the touch IC 231 and touch panel 232 through the line 315. Although not shown in FIG. 6B, in an embodiment, the first PMIC 251 may supply power to components (e.g., the display 210, a sensor, and/or the communication module 220) included in the electronic device 201 in addition to the processor 280 and the touch input unit 230.

In an embodiment, the processor 280 may be changed from a deactivated state to an activated state based on power being supplied from the first PMIC 251. If the processor 280 is activated, the processor 280 may perform communication with the touch IC 231 through the line 325. Although not shown in FIGS. 6A and 6B, in an embodiment, the processor 280 may perform communication with the battery controller 273 through a line (not shown). In an embodiment, the processor 280 may perform an operation of booting the electronic device 201 after the processor 280 is changed from the deactivated state to the activated state.

Figure 7:
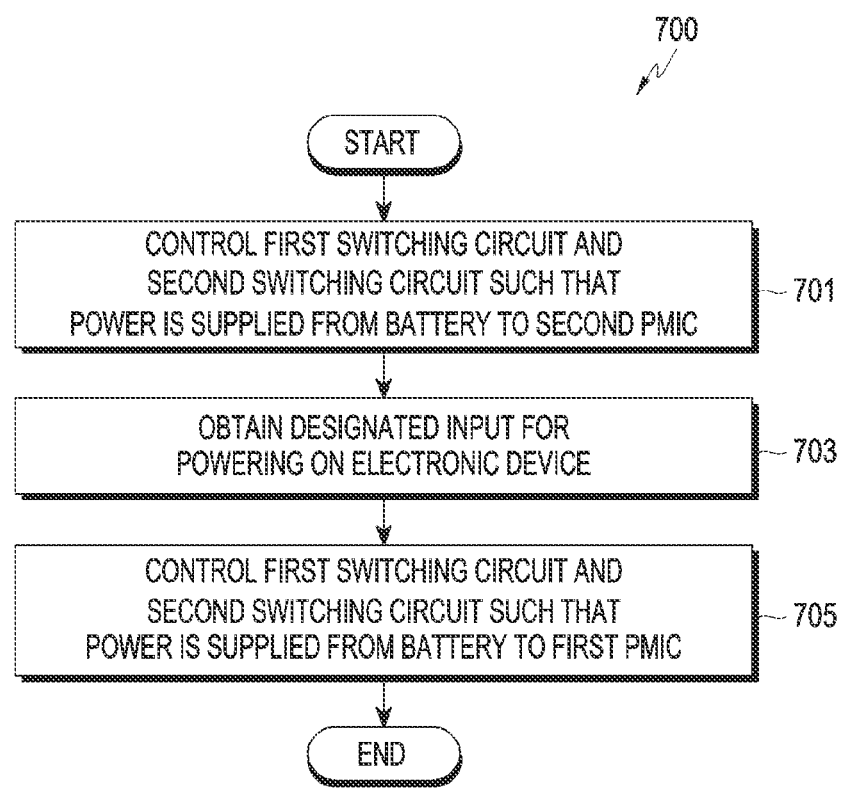
FIG. 7 is a flowchart illustrating a method of controlling power according to an embodiment.

FIG. 7 is a flowchart 700 illustrating a method of controlling power according to an embodiment.

Referring to FIG. 7, in operation 701, in an embodiment, the battery controller 273 may control, the first switching circuit 261 and the second switching circuit 262 such that power is supplied from the battery 271 to the second PMIC 252 and no power is supplied from the battery 271 to the first PMIC 251 (e.g., such that the electronic device 201 is in the power off state). Hereinafter, operation 801 will be described with reference to FIG. 8A.

Figure 8A:
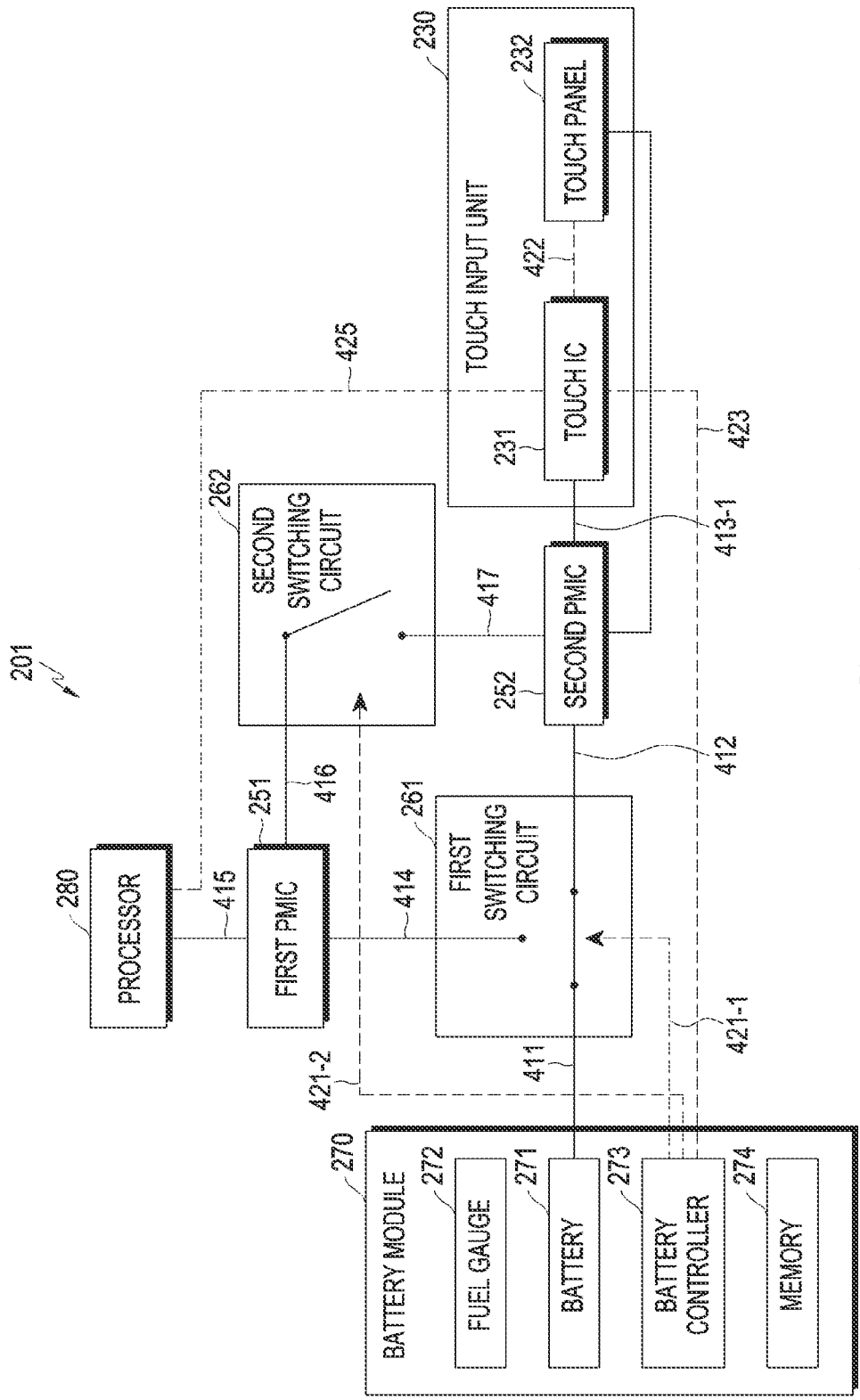
FIG. 8A is a diagram of illustrating an operation performed by an electronic device in a power off state according to an embodiment.

FIG. 8A is a diagram of illustrating an operation performed by an electronic device 201 in a power off state according to an embodiment.

Referring to FIG. 8A, in an embodiment, FIG. 8A may be substantially the same as FIG. 4 except for the switching states of the first switching circuit 261 and the second switching circuit 262.

In an embodiment, the battery controller 273 may control the first switching circuit 261 and the second switching circuit 262 such that the battery 271 and the second PMIC 252 are connected and the first PMIC 251 and the second PMIC 252 are not connected while the electronic device 201 is in the powered off state. For example, as shown in FIG. 8A, the battery controller 273 may control the first switching circuit 261 such that the line 411 and the line 412 are connected through the first switching circuit 261 while the electronic device 201 is in the powered off state. For example, the battery controller 273 may control the first switching circuit 261 such that power is supplied from the battery 271 to the second PMIC 252 while the electronic device 201 is in the powered off state. For example, the battery controller 273 may control the second switching circuit 262 such that the second switching circuit 262 connected to the first PMIC 251 and the second PMIC 252 is in an open state (e.g., such that the line 416 and the line 417 are not connected) while the electronic device 201 is in the powered off state.

In an embodiment, the second PMIC 252 may manage the power supplied from the battery 271 to the touch input unit 230 (e.g., provide power, distribute power, and/or convert a voltage and/or a current). For example, the second PMIC 252 may provide power required by the touch IC 231 and the touch panel 232 to the touch IC 231 through the lines 413-1 and 413-2.

Referring again to FIG. 7, in operation 703, in an embodiment, the battery controller 273 may obtain a designated input for powering on the electronic device 201.

Since operation 703 is at least partially the same or similar to operation 503 of FIG. 5, a repeated detailed description will be omitted.

In operation 705, in an embodiment, the battery controller 273 may control, based on obtaining the designated input for powering on the electronic device 201, the first switching circuit 261 and the second switching circuit 262 such that power is supplied from the battery 271 to the first PMIC 251 (and power is supplied from the first PMIC 251 to the second PMIC 252). Hereinafter, operation 705 will be described with reference to FIG. 8B.

Figure 8B:
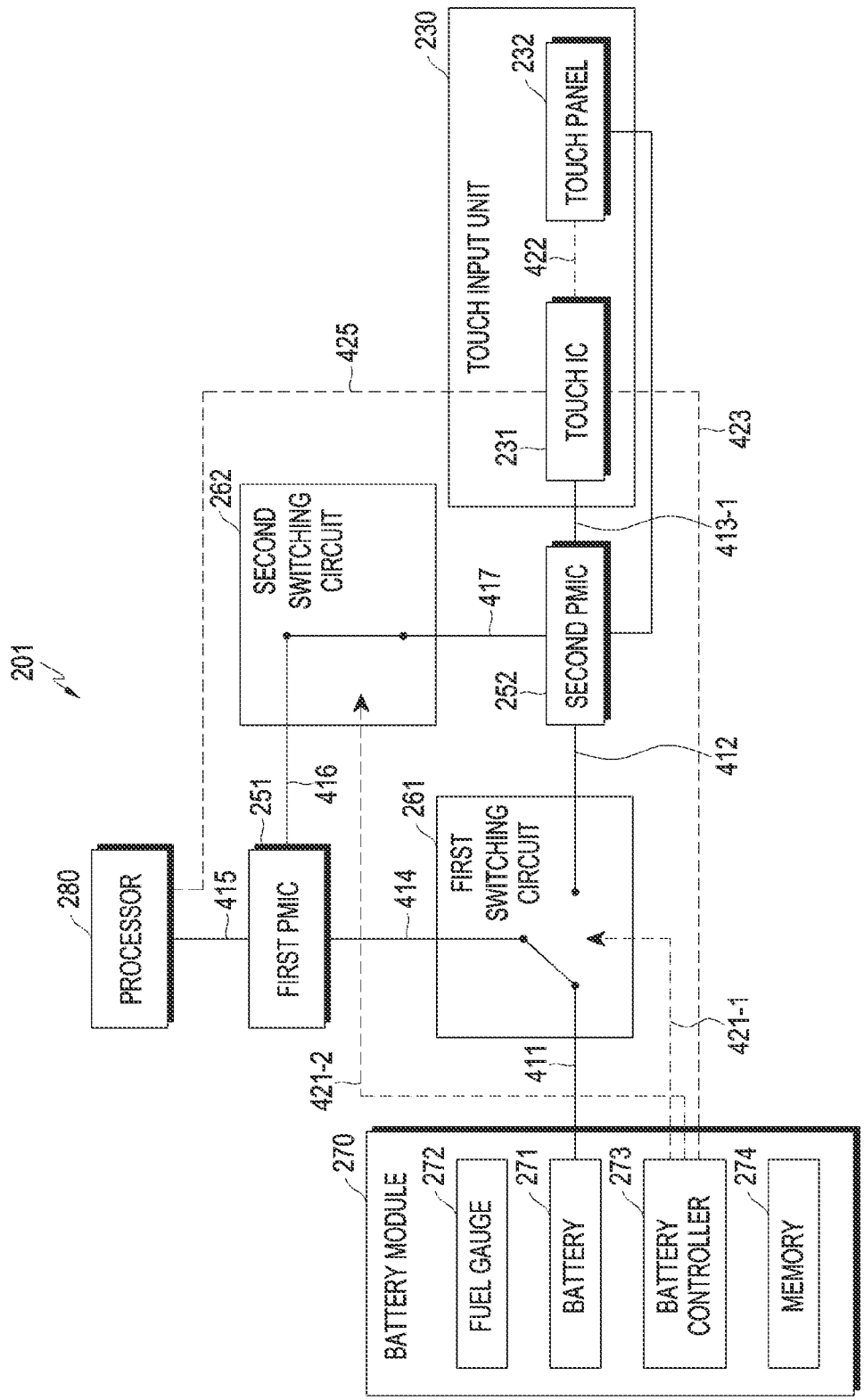
FIG. 8B is a diagram of illustrating an operation performed, based on obtaining a designated input for powering on an electronic device, by an electronic device according to an embodiment.

FIG. 8B is a diagram of illustrating an operation performed, based on obtaining a designated input for powering on an electronic device 201, by an electronic device according to an embodiment.

Referring to FIG. 8B, in an embodiment, FIG. 8B may be substantially the same as FIG. 4 except for the switching state of the first switching circuit 261.

In an embodiment, the battery controller 273 may control, based on obtaining the designated input for powering on the electronic device 201, the first switching circuit 261 and the second switching circuit 262 such that power is supplied from the battery 271 to the first PMIC 251 and from the first PMIC 251 to the second PMIC 252. For example, as shown in FIG. 8B, the battery controller 273 may provide, based on obtaining the designated input for powering on the electronic device 201, a control signal to the first switching circuit 261 through the line 421-1 such that the line 411 and the line 414 are connected via first switching circuit 261 (e.g., such that the battery 271 and the first PMIC 251 are connected). The battery controller 273 may provide, based on obtaining the designated input for powering on the electronic device 201, a control signal to the second switching circuit 262 through the line 421-2 such that the lines 416 and 417 are connected via second switching circuit 262 (e.g., such that the first PMIC 251 and the second PMIC 252 are connected).

In an embodiment, the first PMIC 251 may provide power to the second PMIC 252 through the second switching circuit 262 if the first PMIC 251 and the second PMIC 252 are connected. The second PMIC 252 may provide power to the touch input unit 230 based on the power supplied from the first PMIC 251.

In an embodiment, the first PMIC 251 may supply power to the processor 280 if power is supplied from the battery 271. For example, the first PMIC 251 may supply power to the processor 280 through the line 415. Although not shown in FIG. 8B, in an embodiment, the first PMIC 251 may supply power to components (e.g., the display 210, a sensor module 240, and/or the communication module 220) included in the electronic device 201 in addition to the processor 280 and the second PMIC 252.

In an embodiment, the processor 280 may change from a deactivated state to an activated state based on power being supplied from the first PMIC 251. If the processor 280 is activated, the processor 280 may perform communication with the touch IC 231 through the line 425. Although not shown in FIGS. 8A and 8B, in an embodiment, the processor 280 may perform communication with the battery controller 273 through a line (not shown).

In an embodiment, the processor 280 may perform an operation of booting the electronic device 201 after the processor 280 is changed from the deactivated state to the activated state.

Figure 9:
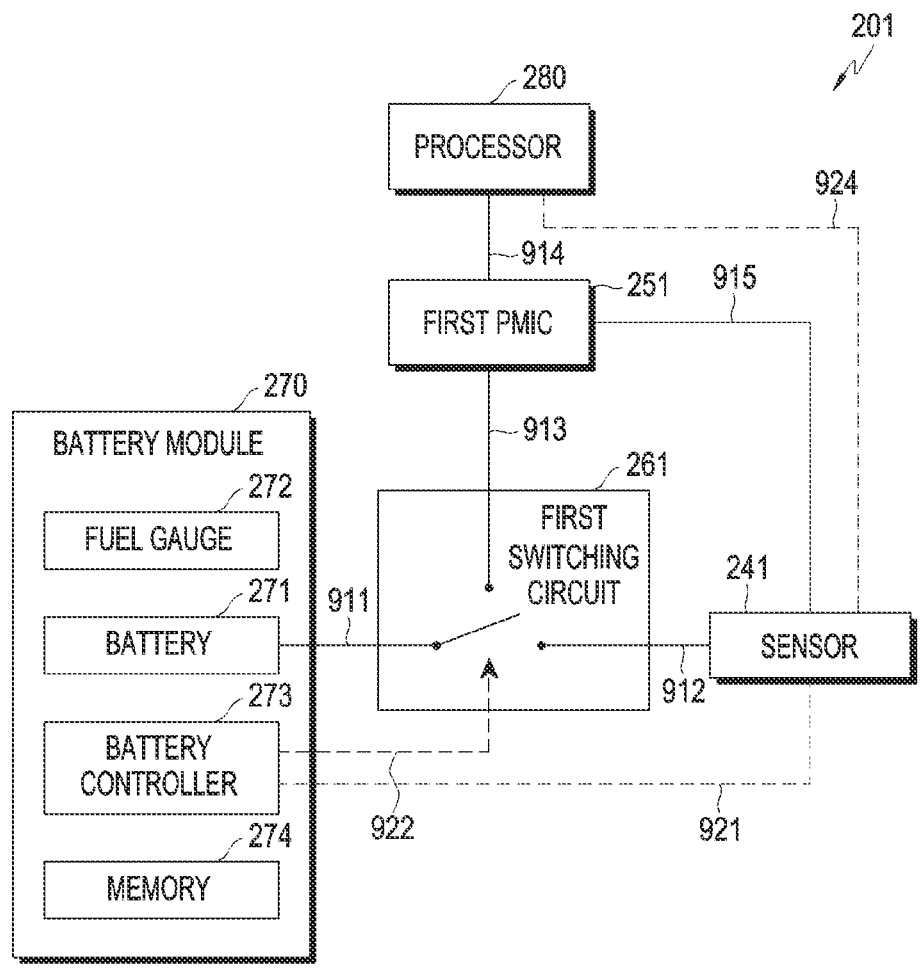
FIG. 9 is a diagram illustrating an electronic device according to an embodiment.

FIG. 9 is a diagram illustrating an electronic device 201 according to an embodiment.

Referring to FIG. 9, in an embodiment, the electronic device 201 may include a sensor 241, a first PMIC 251, a first switching circuit 261, a battery module 270, and/or a processor 280.

In an embodiment, the sensor 241 may be included in the sensor module 240 of FIG. 2.

In an embodiment, the sensor 241 may include a sensor capable of obtaining a designated input for powering on electronic device 201. For example, the sensor 241 may include an ultrasonic sensor and/or a proximity sensor capable of detecting touch input to sensor 241 (or a portion of electronic device 201 at which sensor 241 is disposed) and/or proximity to sensor 241.

In an embodiment, the ultrasonic sensor may include a transmitter that transmits an ultrasonic wave (e.g., a sound pressure in a band of about 20 kHz) and a receiver that receives an ultrasonic wave reflected by an object. The ultrasonic sensor may detect, based on a time difference between a time when the ultrasonic wave is transmitted from the transmitter and a time when the ultrasonic wave is received at the receiver after the ultrasonic wave is reflected by the object, and a speed of the ultrasonic wave (e.g., a speed of a sound), the touch input and/or the proximity to the ultrasonic sensor (or the portion of the electronic device 201 at which the ultrasonic sensor is disposed).

In an embodiment, the proximity sensor may include a light emitting unit that emits a light and a light receiving unit that receives a light reflected by an object. The proximity sensor may detect, based on a time difference between a time when the light is emitted from the light emitting unit and a time when the light receiving unit receives the light after the light is reflected by the object, and a speed of the light, the touch input and/or the proximity to the proximity sensor (or the portion of the electronic device 201 at which the proximity sensor is disposed).

However, the sensor 241 that can obtain a designated input for powering on the electronic device 201 is not limited to the ultrasonic sensor and the proximity sensor. For example, the sensor 241 may include an ultra wide band (UWB) module that can obtain a designated input for powering on the electronic device 201.

In an embodiment, the battery module 270 may include a battery 271, a fuel gauge 272, a battery controller 273, and/or memory 274.

In an embodiment, the battery controller 273 may control the first switching circuit 261 such that the battery 271 and the sensor 241 are connected while the electronic device 201 is in the power off state. For example, the battery controller 273 may control the first switching circuit 261 such that power is supplied from the battery 271 to the sensor 241 (e.g., the line 911 and the line 912 are connected through the first switching circuit 261) while the electronic device 201 is in the power off state.

In an embodiment, the battery controller 273 may obtain a designated input for powering on the electronic device 201 through the sensor 241 while the electronic device 201 is in the power off state. For example, sensor 241 may detect (e.g., sense) a touch input of a user (or proximity input) to sensor 241 (and the portion of electronic device 201 at which sensor 241 is placed). The sensor 241 may provide the touch input to the battery controller 273 through the line 921. The battery controller 273 may obtain a designated input for powering on the electronic device 201 by identifying whether the touch input received from the sensor 241 is a designated input for powering on the electronic device 201.

In an embodiment, the designated input for powering on the electronic device 201 may include a touch input (or proximity input) input to the sensor 241 for a designated time (or more than a designated time). In an embodiment, the designated input for powering on the electronic device 201 may include a touch input inputted to the sensor 241 by a designated number of times (e.g., twice). However, the designated input for powering on the electronic device 201 is not limited to the above-described examples. For example, a designated input for powering on the electronic device 201 may have a designated pattern and include a touch input inputted to the sensor 241.

In an embodiment, the battery controller 273 may control, based on obtaining the designated input for powering on the electronic device 201, the first switching circuit 261 such that power is supplied from the battery 271 to the first PMIC 251. For example, the battery controller 273 may provide, based on obtaining a designated input for powering on the electronic device 201 through the sensor 241, a control signal to the first switching circuit 261 through the line 922 such that battery 271 and the first PMIC 251 are connected (e.g., the line 911 and the line 913 are connected via the first switching circuit 261).

In an embodiment, the first PMIC 251 may supply power to the processor 280 and the sensor 241 if power is supplied from the battery 271. For example, the first PMIC 251 may supply power to the processor 280 through the line 914 and to the sensor 241 through the line 915. Although not shown in FIG. 9, in an embodiment, the first PMIC 251 may supply power to components (e.g., the display 210, the touch input unit 230, and/or the communication module 220) included in the electronic device 201 in addition to the processor 280 and the sensor 241.

In an embodiment, the processor 280 may be changed from a deactivated state to an activated state based on power being supplied from the first PMIC 251. If the processor 280 is activated, the processor 280 may control the sensor 241 through line 924. Although not shown in FIG. 9, in an embodiment, the processor 280 may perform communication with the battery controller 273 through a line (not shown).

In an embodiment, the processor 280 may perform an operation of booting the electronic device 201 after the processor 280 is changed from the deactivated state to the activated state.

Although not shown in FIG. 9, the electronic device 201 may further comprise a second PMIC (252) and a second switching circuit 262, wherein the second PMIC (252) manages power supplied from the battery 271 to the touch input unit 230 and is connected to a first switching circuit 261, a second switching circuit 262, and the sensor (241), wherein the second switching circuit (262) is connected to the first PMIC (251) and the sensor (241). The operation of the electronic device 201 further comprising the second PMIC 252 and the second switching circuit 262, is at least partially the same or similar to the operation of the electronic device 201 of FIG. 4, and therefore detailed description is omitted.

Figure 10:
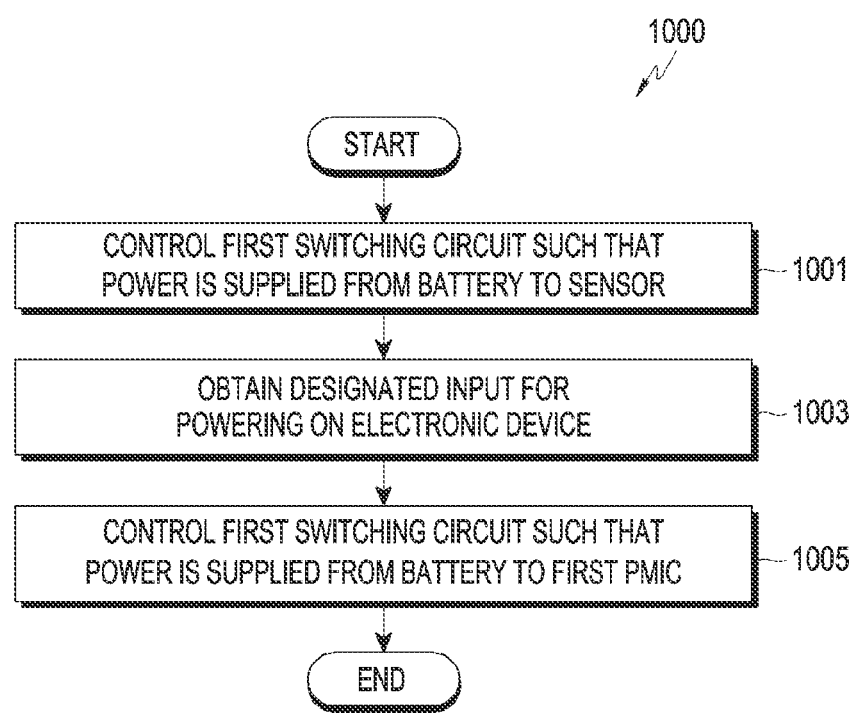
FIG. 10 is a flowchart illustrating a method of controlling power according to an embodiment.

FIG. 10 is a flowchart 1000 illustrating a method of controlling power according to an embodiment.

Referring to FIG. 10, in operation 1001, in an embodiment, the battery controller 273 may control the first switching circuit 261 such that power is supplied from the battery 271 to the sensor 241 and no power is supplied from the battery 271 to the first PMIC 251 (e.g., such that the electronic device 201 is in the power off state). Hereinafter, operation 1001 will be described with reference to FIG. 11A.

Figure 11A:
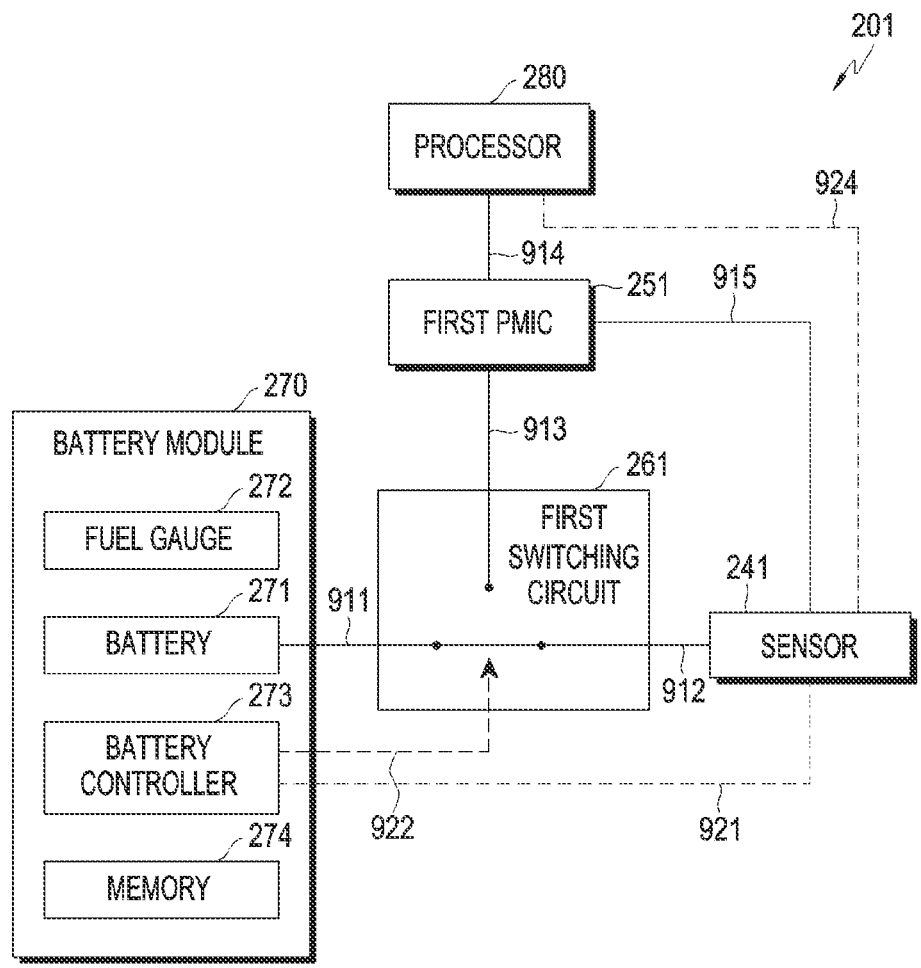
FIG. 11A is a diagram of illustrating an operation performed by an electronic device in a power off state according to an embodiment.

FIG. 11A is a diagram of illustrating an operation performed by an electronic device 201 in a power off state according to an embodiment.

Referring to FIG. 11A, in an embodiment, FIG. 11A may be substantially the same as FIG. 9 except for the switching state of the first switching circuit 261.

In an embodiment, the battery controller 273 may control the first switching circuit 261 such that the battery 271 and the sensor 241 are connected while the electronic device 201 is in a power off state. For example, as shown in FIG. 11A, battery controller 273 may control the first switching circuit 261 such that the line 911 and the line 912 are connected through the first switching circuit 261 while the electronic device 201 is in a power off state. If the line 911 and the line 912 are connected through the first switching circuit 261, power can be supplied from the battery 271 to the sensor 241.

In an embodiment, the sensor 241 may include a sensor capable of obtaining a designated input for powering on electronic device 201. For example, the sensor 241 may include an ultrasonic sensor and/or a proximity sensor capable of detecting touch input to and/or proximity to sensor 241 (or the portion of electronic device 201 at which sensor 241 is disposed). However, the sensor that can obtain the designated input for powering on the electronic device 201 is not limited to the ultrasonic sensor and the proximity sensor. For example, the sensor 241 capable of obtaining the designated input for powering on the electronic device 201 may further include at least one of a capacitive sensor, a piezo sensor, or a pressure type sensor.

Referring back to FIG. 10, in operation 1003, in an embodiment, the battery controller 273 may obtain a designated input for powering on the electronic device 201. For example, the battery controller 273 may obtain the designated input for powering on the electronic device 201 through the sensor 241 while the electronic device 201 is in the power off state. The sensor 241 may detect (e.g., sense) a touch input of a user (or proximity input) to the sensor 241 (and a portion of the electronic device 201 where the sensor 241 is disposed). The sensor 241 may provide the touch input to the battery controller 273 through the line 921. The battery controller 273 may obtain the designated input for powering on the electronic device 201 by identifying whether the touch input received from the sensor 241 is the designated input for powering on the electronic device 201.

In an embodiment, the designated input for powering on the electronic device 201 may include a touch input (or proximity input) inputted to the sensor 241 for a designated time (or more than a designated time). In an embodiment, the designated input for powering on the electronic device 201 may include a touch input inputted to the sensor 241 by a designated number of times (e.g., twice). However, the designated input for powering on the electronic device 201 is not limited to the above-described examples. For example, the designated input for powering on the electronic device 201 may include a touch input inputted to the sensor 241 with a designated pattern.

In operation 1005, in an embodiment, the battery controller 273 may control, based on obtaining the designated input for powering on the electronic device 201, the first switching circuit 261 to supply power from the battery 271 to the first PMIC 251. Hereinafter, operation 1005 will be described with reference to FIG. 11B.

Figure 11B:
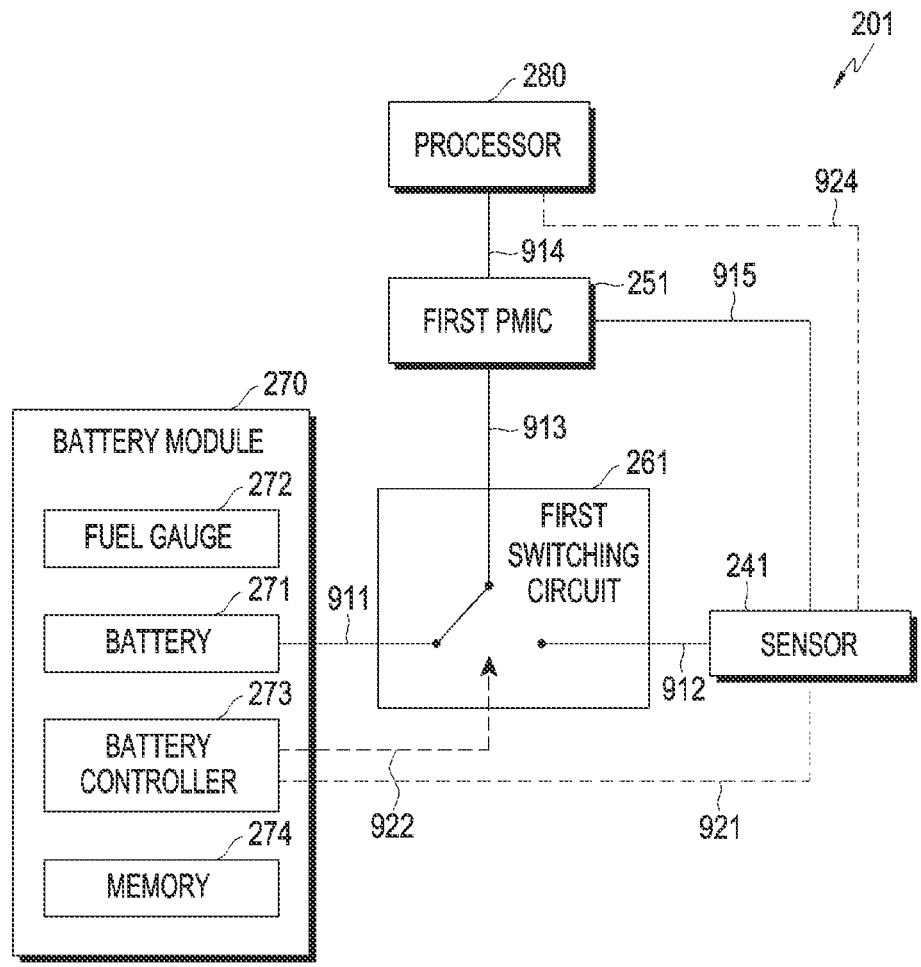
FIG. 11B is a diagram of illustrating an operation performed, based on obtaining a designated input for powering on an electronic device, by an electronic device according to an embodiment.

FIG. 11B is a diagram of illustrating an operation performed, based on obtaining a designated input for powering on an electronic device 201, by an electronic device according to an embodiment.

Referring to FIG. 11B, in an embodiment, FIG. 11B may be substantially the same as FIG. 9 except for the switching state of the first switching circuit 261.

In an embodiment, the battery controller 273 may control, based on obtaining the designated input for powering on the electronic device 201, the first switching circuit 261 such that power is supplied from the battery 271 to the first PMIC 251. For example, as shown in FIG. 11B, the battery controller 273 may provide, based on obtaining the designated input for powering on the electronic device 201 through the sensor 241, a control signal to the first switching circuit 261 through the line 922 such that line 911 and line 913 are connected through first switching circuit 261. If the line 911 and line 913 are connected through the first switching circuit 261, power may be supplied from the battery 271 to the first PMIC 251.

In an embodiment, the first PMIC 251 may supply power to the processor 280 and the sensor 241 if power is supplied from the battery 271 to the first PMIC 251. For example, the first PMIC 251 may supply power to the processor 280 through the line 914 and to the sensor 241 through the line 915. Although not shown in FIG. 11B, in an embodiment, the first PMIC 251 may supply power to components (e.g., the display 210, the touch input unit 230, and/or the communication module 220) included in the electronic device 201 in addition to the processor 280 and the sensor 241.

In an embodiment, the processor 280 may be changed from a deactivated state to an activated state based on power being supplied from the first PMIC 251. If the processor 280 is activated, the processor 280 may control the sensor through line 924. Although not shown in FIGS. 11A and 11B, in an embodiment, the processor 280 may perform communication with the battery controller 273 through a line (not shown).

In an embodiment, the processor 280 may perform an operation of booting the electronic device 201 after the processor 280 is changed from the deactivated state to the activated state.

Figure 12:
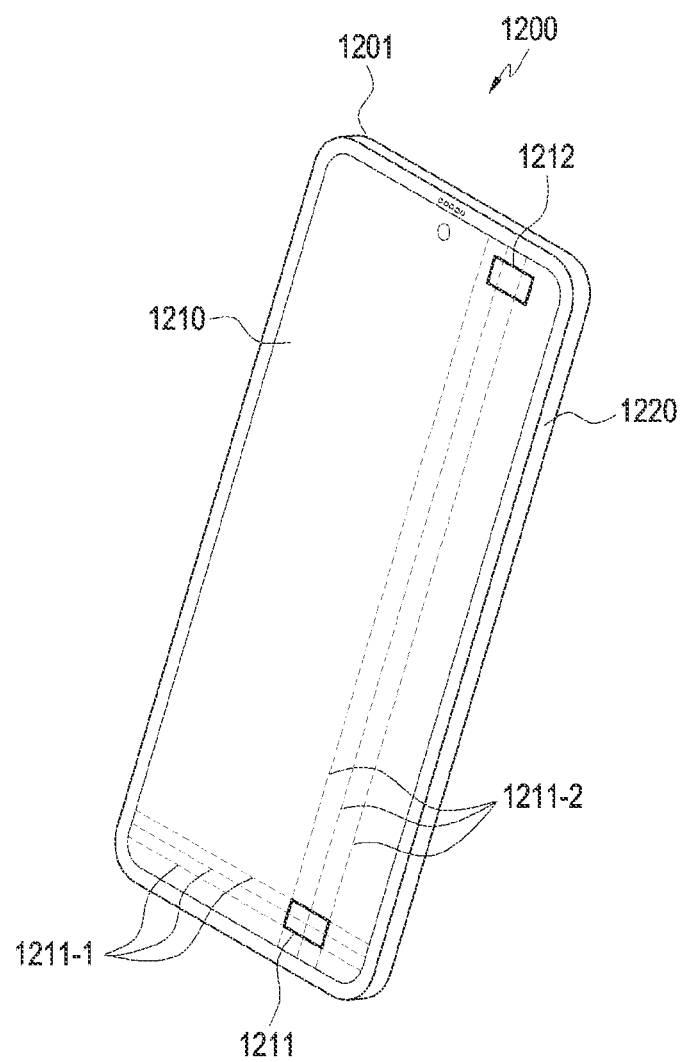
FIG. 12 is a diagram illustrating an electronic device according to an embodiment.

FIG. 12 is a diagram 1200 illustrating an electronic device 1201 according to an embodiment.

In an embodiment, FIG. 12 may be a diagram to explain the various locations (or areas) where the touch input unit 230 and/or the sensor 241 can be placed in the electronic device 1201, the touch input unit 230 and/or the sensor 241 being capable of detecting the designated input for powering on the electronic device 1201.

Referring to FIG. 12, in an embodiment, the electronic device 1201 may be the electronic device 201 of FIG. 2.

In an embodiment, the electronic device 1201 (e.g., a bar-type smart phone) may include a touch input unit 230 (or a touch sensor) capable of detecting the designated input for powering on the electronic device 1201. Note that, for clarity, the touch input unit 230 is not separately indicated in FIG. 12 (instead, touch input unit 230 is indicated via display 1210 and/or area 1211 as described below).

In an embodiment, a size of an entire area of the touch input unit 230 may be substantially the same as a size of an entire area of the display 1210.

In an embodiment, a portion area of the entire area of the touch panel 232 (e.g., an area corresponding to the area 1211 of the display 1210 in the entire area of the touch panel 232) may be designated (e.g., set) to obtain (e.g., detect) the designated input for powering on the electronic device 1201. For example, in a case that the touch input unit 230 uses a mutual capacitive scheme, in the power off state, power may be supplied from the battery 271 to a subset of the entire electrodes (e.g., entire TX electrodes to which driving signal is applied and entire RX electrodes providing electrical signal detected by a touch) of the touch panel 232 and the touch IC 231. In an embodiment, the subset of the electrodes (e.g., TX electrodes 1211-1 and RX electrodes 1211-2) may be positioned for detecting a touch on a region of the touch panel 232 and corresponding to an area 1211 of the display 1210. In the power off state, power may be not supplied from the battery 271 to remaining electrodes other than the TX electrodes 1211-1 and the RX electrodes 1211-2.

However, it is not limited to this. For example, an area of the touch input unit 230 (or a touch pad disposed on the side 1220 of the electronic device 1201) disposed on the side 1220 of the electronic device 1201 (or exposed through the side 1220) may be designated to obtain a designated input for powering on the electronic device 1201.

In an embodiment, electronic device 1201 may include a sensor 241 (e.g., an ultrasonic sensor and/or a proximity sensor) that can detect a designated input for powering on electronic device 1201. Note that, for clarity, the sensor 241 is not separately indicated in FIG. 12 (instead, sensor 241 is indicated via side 1220 and/or area 1212 as described below).

In an embodiment, the ultrasonic sensor may be placed on the side 1220 of the electronic device 1201 (e.g., a side frame of the electronic device 1201). For example, the ultrasonic sensor may be placed on the side 1220 of the electronic device 1201 such that the ultrasonic sensor transmits an ultrasonic wave in a direction toward the outside of the electronic device 1201 and receives the ultrasonic wave reflected by an object. In FIG. 12, a right side of the electronic device 1201 is illustrated as the side of the electronic device 1201, but it is not limited thereto. For example, the side of the electronic device 1201 on which the ultrasonic sensor can be placed may include an upper side, a lower side, a right side, and/or a left side of the electronic device 1201.

In an embodiment, the proximity sensor may be placed in a position (or area) that overlaps (or does not overlap) with an area where the display 1210 of the electronic device 1201 is placed. For example, the proximity sensor may be placed in an area corresponding to a partial area 1212 of the display 1210 of the electronic device 1201.

In an embodiment, the electronic device 201 may not include any physical keys (e.g., a physical power key). Entire sides (e.g., a side 1220) of the electronic device 201 may not include a protruding portion FIG. 13 is a diagram 300 illustrating an electronic device 201 according to an embodiment.

Figure 13:
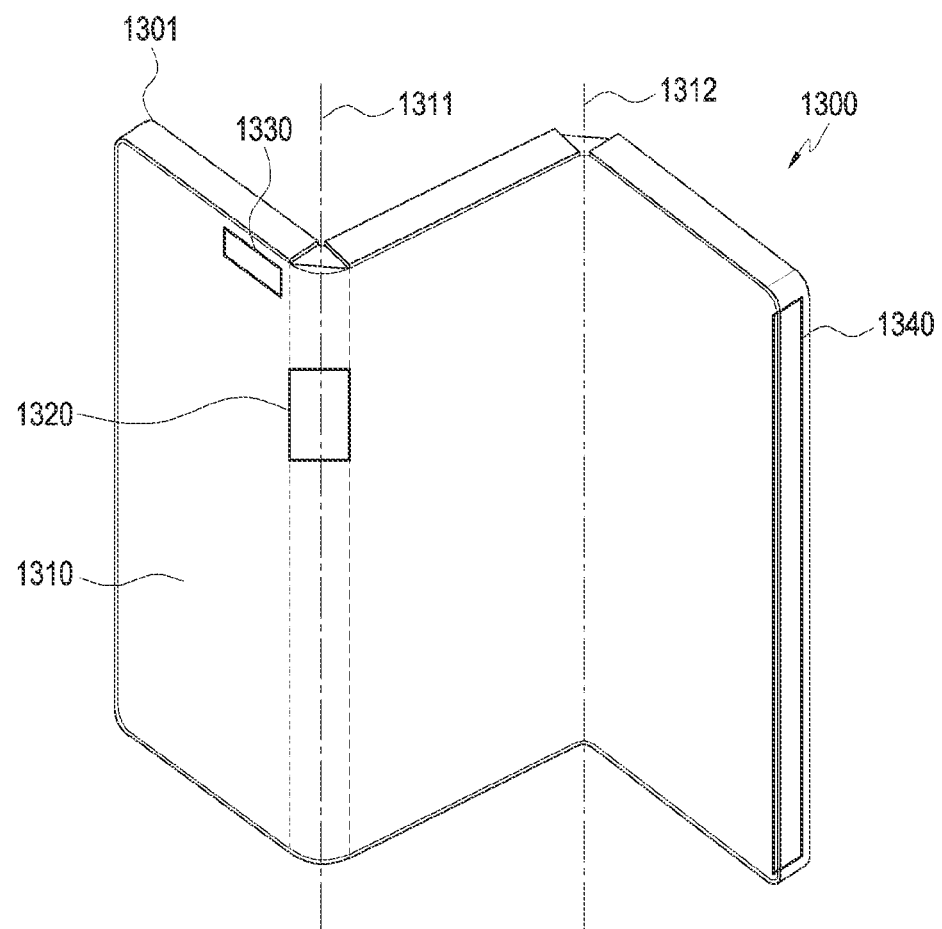
FIG. 13 is a diagram illustrating an electronic device according to an embodiment.

In an embodiment, FIG. 13 may be a diagram to explain a location (or area) where the touch input unit 230 and/or the sensor 241 is placed in an electronic device 1301 including a foldable display, the touch input unit 230 and/or the sensor 241 being capable of detecting a designated input for powering on the electronic device 1301. Note that, for clarity, the touch input unit 230 and the sensor 241 are not separately indicated in FIG. 13 (instead, touch input unit 230 and sensor 241 are indicated via area 1320 and side 1340, respectively, as described below).

Referring to FIG. 13, in an embodiment, the electronic device 1301 may be the electronic device 201 of FIG. 2.

In an embodiment, the electronic device 1301 may be an electronic device that can be folded or unfolded based on the first folding axis 1311 and the second folding axis 1312. For example, the electronic device 201 may comprise a plurality of housings, at least one hinge configured to rotate the plurality of housings, and a foldable display disposed in the plurality of housings.

In an embodiment, the electronic device 1301 may include a touch input unit 230 (or a touch sensor) that can detect a designated input for powering on the electronic device 1301.

In an embodiment, a portion area of the entire area of the touch panel 232 (e.g., an area corresponding to the area 1320 of the display 1310 in the entire area of the touch panel 232) may be designated (e.g., set) to obtain (e.g. detect) the designated input for powering on the electronic device 1301. For example, the area 1320 of the display 1310 may be an area that is formed as a curved surface with a certain curvature in the entire area of the display 1310 that can be folded or unfolded. The area 1320 may be a portion of an area corresponding to the at least one hinge of the electronic device 201. A portion of the area designated to obtain a designated input for powering on the electronic device 1301 in the entire area of the touch panel 232 may be an area corresponding to the area 1320 that is formed as a curved surface with a certain curvature in the entire area of the display 1310.

However, it is not limited to this. For example, the area of the touch input unit 230 disposed on the side 1340 of the electronic device 1301 (or exposed through the side 1340) (or the touch input unit 230 disposed on the side 1340 of the electronic device 1301) may be designated to obtain the designated input for powering on the electronic device 1301.

In an embodiment, the electronic device 1301 may include a sensor (e.g., an ultrasonic sensor and/or a proximity sensor) that can detect a designated input for powering on the electronic device 1301. In an embodiment, the ultrasonic sensor may be placed on the side 1340 of the electronic device 1301 (e.g., a side frame of the electronic device 1301).

In an embodiment, the proximity sensor may be placed in a position (or area) that overlaps (or does not overlap) with the area where the display 210 of the electronic device 201 is placed. For example, the proximity sensor may be placed in a portion 1330 of the area where the display 1310 of the electronic device 1301 is placed.

Figure 14:
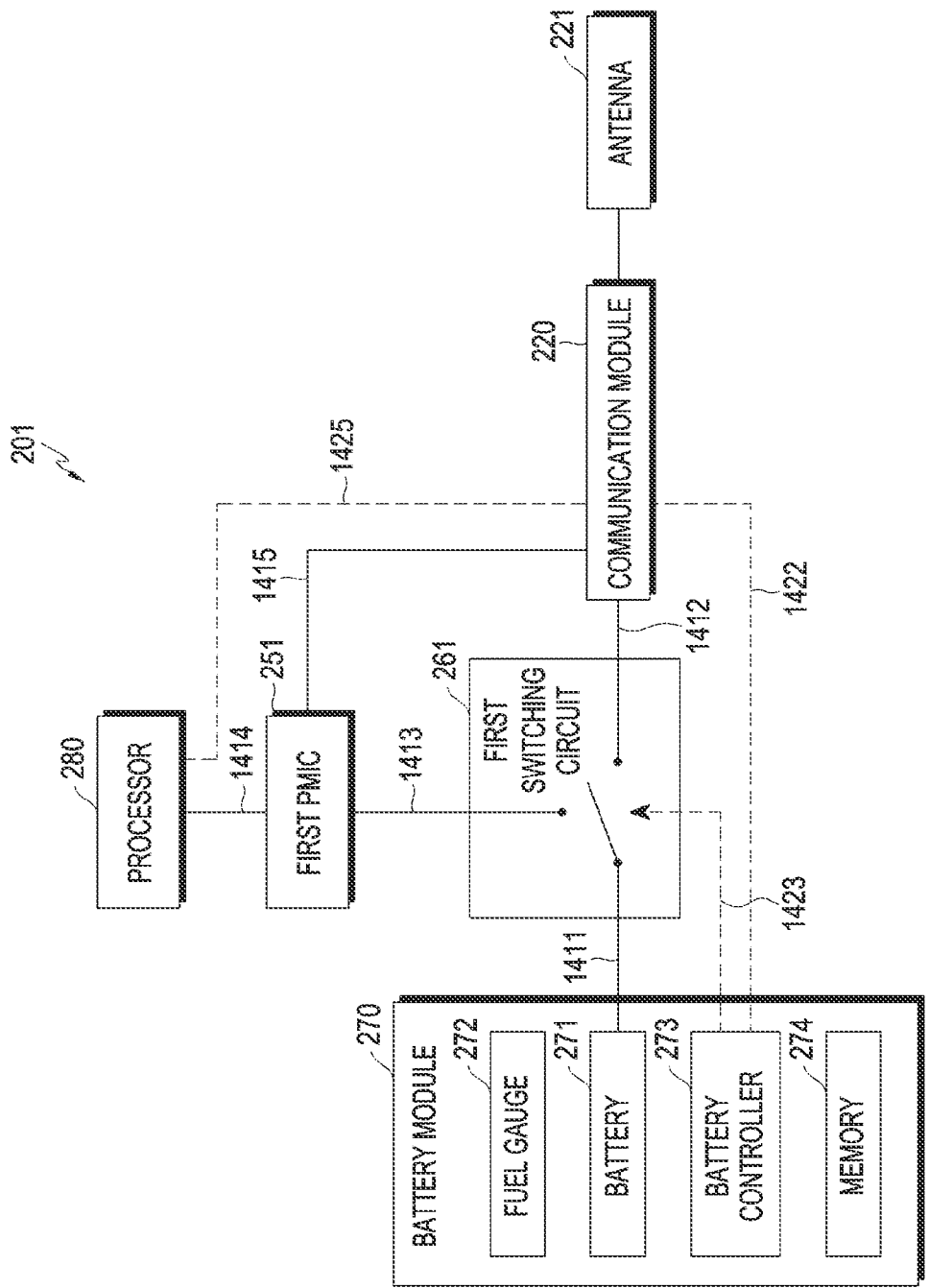
FIG. 14 is a diagram illustrating an electronic device according to an embodiment.

FIG. 14 is a diagram illustrating an electronic device 201 according to an embodiment.

Referring to FIG. 14, in an embodiment, the electronic device 201 includes a communication module 220, an antenna 221, a first PMIC 251, a first switching circuit 261, a battery module 270, and/or a processor 280.

In an embodiment, the communication module 220 may receive a designated signal for powering on the electronic device 201 from an external electronic device wirelessly (or wired) connected to the electronic device 201 through the antenna 221. For example, the communication module 220 (e.g., Bluetooth module) may receive a signal including a designated command for powering on the electronic device 201 from the external electronic device (e.g., an wearable electronic device) through the antenna 221.

In an embodiment, the communication module 220 may transmit the designated signal to the battery controller 273. For example, the communication module 220 may transmit the designated signal to the battery controller 273 through the line 1422.

In an embodiment, the battery module 270 may include a battery 271, a fuel gauge 272, a battery controller 273, and/or memory 274.

In an embodiment, the battery controller 273 may control the first switching circuit 261 such that the battery 271 and the communication module 220 are connected while the electronic device 201 is in a power off state. For example, the battery controller 273 may control the first switching circuit 261 such that power is supplied from the battery 271 to the communication module 220 (e.g., such that the line 1411 and the line 1412 are connected through the first switching circuit 261) while the electronic device 201 is in the power off state.

In an embodiment, the battery controller 273 may obtain a designated signal for powering on the electronic device 201 received from an external electronic device through the communication module 220 while the electronic device 201 is in the power off state. For example, the communication module 220 may receive a signal from an external electronic device. The communication module 220 may transmit the signal to the battery controller 273 through the line 1422. The battery controller 273 may identify whether the signal received from the communication module 220 is the designated signal for powering on the electronic device 201.

In an embodiment, the battery controller 273 may control, based on receiving the designated signal for powering on the electronic device 201, the first switching circuit 261 such that power is supplied from the battery 271 to the first PMIC 251. For example, the battery controller 273 may provide, based on obtaining, through the communication module 220, the designated input for powering on the electronic device 201, a control signal to the first switching circuit 261 through the line 1423 such that the battery 271 and the first PMIC 251 are connected (e.g., such that the line 1411 and the line 1413 are connected through the first switching circuit 261).

In an embodiment, the first PMIC 251 may supply power to the processor 280 and the communication module 220 if power is supplied from the battery 271 to the first PMIC 251. For example, the first PMIC 251 may supply power to the processor 280 through the line 1414 and to the communication module 220 through the line 1415. Although not shown in FIG. 14, in an embodiment, the first PMIC 251 may supply power to components (e.g., the display 210, the touch input unit 230, and/or the sensor module 240) included in the electronic device 201 in addition to the processor 280 and the communication module.

In an embodiment, the processor 280 may be changed from a deactivated state to an activated state based on power being supplied from the first PMIC 251. If the processor 280 is activated, the processor 280 may control the communication module 220 through line 1425. Although not shown in FIG. 14, in an embodiment, the processor 280 may perform communication with the battery controller 273 through a line (not shown).

In an embodiment, the processor 280 may perform an operation of booting the electronic device 201 after the processor 280 is changed from a deactivated state to an activated state.

Although not shown in FIG. 14, the electronic device 201 may further comprise a second PMIC (252) and a second switching circuit 262, wherein the second PMIC (252) manages power supplied from the battery 271 to the communication module 220 and is connected to a first switching circuit 261, a second switching circuit 262, and the communication module 220, wherein the second switching circuit (262) is connected to the first PMIC (251) and the communication module 220. A detailed description of the operation of the electronic device 201 further comprising the second PMIC 252 and the second switching circuit 262, will be omitted since at least some of the operations of the electronic device 201 of FIG. 4 or 9 are the same or similar.

Figure 15:
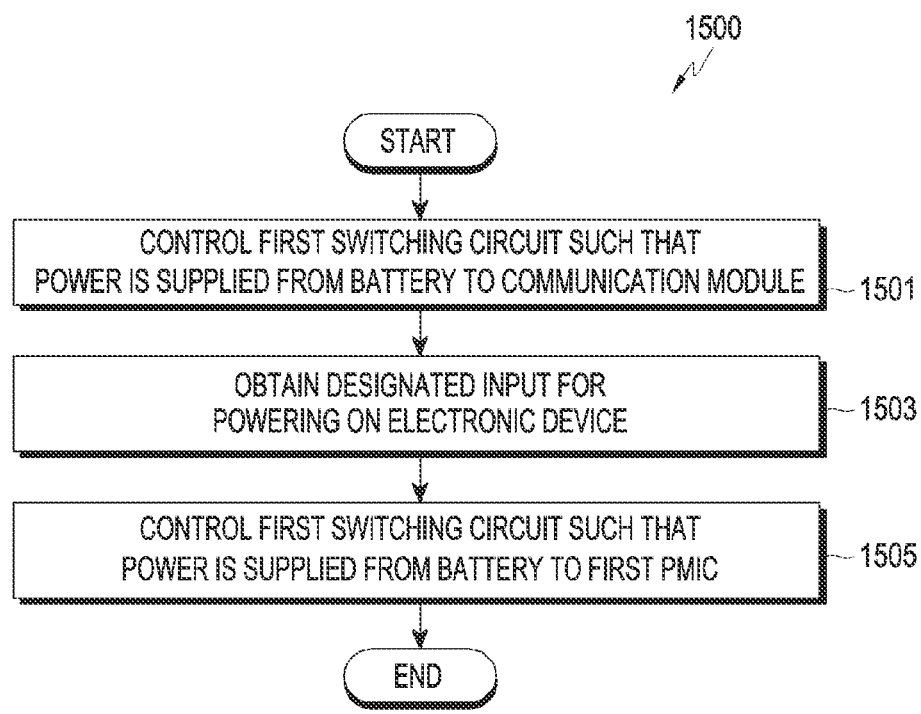
FIG. 15 is a flowchart illustrating a method of controlling power according to an embodiment.

FIG. 15 is a flowchart 1500 illustrating a method of controlling power according to an embodiment.

Referring to FIG. 15, in operation 1501, in an embodiment, the battery controller 273 may control the first switching circuit 261 such that power is supplied from the battery 271 to the communication module 220 and no power is supplied from the battery 271 to the first PMIC 251 (e.g., such that the electronic device 201 is in the power off state).

In operation 1503, in an embodiment, the battery controller 273 may obtain, while the electronic device 201 is in a power off state, a designated signal for powering on the electronic device 201, the designated signal being received from an external electronic device through the communication module 220.

In operation 1505, in an embodiment, the battery controller 273 may control, based on receiving the designated signal for powering on the electronic device 201, the first switching circuit 261 such that power is supplied from the battery 271 to the first PMIC 251.

Since operations 1501, 1503, and 1505 of FIG. 15 are at least partially the same or similar to the operations described with reference to FIG. 14, detailed descriptions thereof will be omitted.

In the above examples, although each of the touch input unit 230 of FIGS. 3 and 4, the sensor 241 of FIG. 9, and the communication module 220 of FIG. 14 is described as being independently connected to the battery 271 or the first PMIC 251 (or the second PMIC 252) by the switching operation of the first switching circuit 261, but it is not limited to this. For example, two or more components of the touch input unit 230, sensor 241, or communication module 220 are connected to the battery 271 or the first PMIC 251 (or the second PMIC 252) in parallel (or simultaneously) by the switching operation of the first switching circuit 261. Through this, the electronic device 201 may obtain (receive) an input (or signal) for powering on the electronic device 201 through two or more components of the touch input unit 230, the sensor 241, or the communication module 220.

The electronic device 201 according to an embodiment may include a touch input unit 230, a first PMIC 251 configured to manage power supplied to electrical components of the electronic device 201, a battery 271, a first switching circuit 261, and a battery controller 273. The battery controller 273 may be configured to control the first switching circuit 261 such that power is supplied from the battery 271 to the touch input unit 230 and no power is supplied from the battery 271 to the first PMIC 251. The battery controller 273 may be configured to obtain an input through the touch input unit 230 while power is supplied from the battery 271 to the touch input unit 230 and no power is supplied from the battery 271 to the first PMIC 251. The battery controller 273 may be configured to control the first switching circuit 261 such that power is supplied from the battery 271 to the first PMIC 251 based on obtaining the input.

In an embodiment, based on power being supplied from the battery 271 to the touch input unit 230 and no power being supplied from the battery 271 to the first PMIC 251, power may be not supplied from the battery 271 to the electrical components through the first PMIC 251. Based on power being supplied from the battery 271 to the first PMIC 251, power is supplied from the battery 271 to the electrical components through the first PMIC 251. That is, upon receiving the input, the battery controller 273 can control the first switching circuit 261 to transition the electronic device 201 from a power off state to a power on state.

In an embodiment, the touch input unit 230 may include a touch IC 231 and a touch panel 232. The touch IC 231 may be configured to detect the input while power is supplied from the battery 271 to the touch input unit 230 and no power is supplied from the battery 271 to the first PMIC 251. The touch IC 231 may be configured to provide the detected input to the battery controller 273.

In an embodiment, the touch input unit 230 may include a touch IC 231 and a touch panel 232. The battery controller 273 may be configured to control the first switching circuit 261 such power is supplied from the battery 271 to the touch IC 231 and a portion of the touch panel 232 while power is supplied from the battery 271 to the touch input unit 230 and no power is supplied from the battery 271 to the first PMIC 251.

In an embodiment, the touch input unit 230 may be disposed on a side of the electronic device 201 or in a region of a display 210 of the electronic device 201.

In an embodiment, the electronic device 201 may not include a physical key. The sides of the electronic device 201 may not include a protruding portion having a physical key thereon.

In an embodiment, the electronic device 201 may further comprise a plurality of housings, at least one hinge (refer, e.g., to the first folding axis 1311 and the second folding axis 1312 of FIG. 13) configured to rotate the plurality of housings, and a foldable display disposed in the plurality of housings. The touch input unit 230 may be disposed in a region corresponding to the at least one hinge in the electronic device 201 (refer, e.g., to area 1320 of FIG. 13).

In an embodiment, the electronic device 201 may further include a second PMIC 252 configured to manage power supplied to the touch input unit 230, and a second switching circuit 262 connected between the first PMIC 251 and the second PMIC 252. The battery controller 273 may be configured to based on the input, control the first switching circuit 261 such that the battery 271 and the first PMIC 251 are connected. The battery controller 273 may be configured to, based on the input, control the second switching circuit 262 such that the first PMIC 251 and the second PMIC 252 are connected.

In an embodiment, the input may include an input of touching the touch input unit 230 for a designated time and/or an input of touching the touch input unit 230 two or more times.

In an embodiment, the electronic device 201 may further include at least one processor 280. The at least one processor 280 may be configured to after power is supplied to the first PMIC 251, display an object through the display 210. The at least one processor 280 may be configured to based on a user input on the object, control the battery controller 273 such that a control signal is provided to the battery controller 273, the control signal being configured to cause the battery controller 273 to perform an operation controlling the first switching circuit 261 such that power is supplied from the battery 271 to the touch input unit 230 and no power is supplied from the battery 271 to the first PMIC 251.

A method for controlling power in an electronic device 201 according to an embodiment, may comprise controlling, by a battery controller 273 of the electronic device 201, a first switching circuit 261 of the electronic device 201 such that power is supplied from a battery 271 of the electronic device 201 to a touch input unit 230 of the electronic device 201 and no power is supplied from the battery 271 to the first PMIC 251. The method may comprise, while power is supplied from the battery 271 to the touch input unit 230 and no power is supplied from the battery 271 to the first PMIC 251, obtaining, by the battery controller 273, an input through the touch input unit 230. The method may comprise controlling, by the battery controller 273, based on obtaining the input, the first switching circuit 261 such that power is supplied from the battery 271 to the first PMIC 251.

In an embodiment, based on power being supplied from the battery 271 to the touch input unit 230 and no power being supplied from the battery 271 to the first PMIC 251, power may be not supplied from the battery 271 to the electrical components of the electronic device 201 through the first PMIC 251. Based on power being supplied from the battery 271 to the first PMIC 251, power may be supplied from the battery 271 to the electrical components through the first PMIC 251.

In an embodiment, the touch input unit 230 may include a touch IC 231 and a touch panel 232. The method may comprise while power is supplied from the battery 271 to the touch input unit 230 and no power is supplied from the battery 271 to the first PMIC 251, detecting, by the touch IC 231, the input. The method may comprise providing, by the touch IC 231, the detected input to the battery controller 273.

In an embodiment, the touch input unit 230 may include a touch IC 231 and a touch panel 232. Controlling the first switching circuit 261 such that power is supplied from the battery 271 to the touch input unit 230 and no power is supplied from the battery 271 to the first PMIC 251 may comprise while power is supplied from the battery 271 to the touch input unit 230 and no power is supplied from the battery 271 to the first PMIC 251, controlling, by the battery controller 273, the first switching circuit 261 such power is supplied from the battery 271 to the touch IC 231 and a portion of the touch panel 232.

In an embodiment, the touch input unit 230 may be disposed on a side of the electronic device 201 or in a region of a display 210 of the electronic device 201.

In an embodiment, the electronic device 201 may not include a physical key. The sides of the electronic device 201 may not include a protruding portion having a physical key thereon.

In an embodiment, the electronic device 201 may further comprise a plurality of housings, at least one hinge configured to rotate the plurality of housings, and a foldable display disposed in the plurality of housings. The touch input unit 230 may be disposed in a region corresponding to the at least one hinge in the electronic device 201.

In an embodiment, controlling, based on the input, the first switching circuit 261 such that power is supplied from the battery 271 to the first PMIC may comprise, based on the input, controlling the first switching circuit 261 such that the battery 271 and the first PMIC 251 are connected. Controlling, based on the input, the first switching circuit 261 such that power is supplied from the battery 271 to the first PMIC may comprise based on the input, controlling the second switching circuit 262 such that the first PMIC 251 and the second PMIC 252 configured to manage power supplied to the touch input unit 230 are connected.

In an embodiment, the input may include an input of touching the touch input unit 230 for a designated time and/or an input of touching the touch input unit 230 two or more times.

A non-transitory computer-readable medium storing computer-executable instructions according to an embodiment, wherein the computer-executable instructions may, when executed by a battery controller 273, cause an electronic device 201 to control a first switching circuit 261 of the electronic device 201 such that power is supplied from a battery 271 of the electronic device 201 to a touch input unit 230 of the electronic device 201 and no power is supplied from the battery 271 to the first PMIC 251. The computer-executable instructions may, when executed by the battery controller 273, cause the electronic device 201 to while power is supplied from the battery 271 to the touch input unit 230 and no power is supplied from the battery 271 to the first PMIC 251, obtain, an input through the touch input unit 230. The computer-executable instructions may, when executed by the battery controller 273, cause the electronic device 201 to control, based on obtaining the input, the first switching circuit 261 such that power is supplied from the battery 271 to the first PMIC 251.

Additionally, the data structure used in the above-described embodiments of the present disclosure can be recorded on a computer-readable recording medium through various means. The computer-readable recording media may include storage media such as magnetic storage media (e.g., ROM, floppy disk, hard disk, etc.) and optical read media (e.g., CD-ROM, DVD, etc.).

The invention claimed is:

1. An electronic device comprising:
   a touch input unit;
   a first power management integrated circuit (PMIC) configured to manage power supplied to electrical components of the electronic device;
   a battery;
   a first switching circuit connected to the battery and configured to selectively connect the touch input onit or the first PMIC to the battery;
   at least one processor; and
   a battery controller,
   wherein the battery controller is configured to:
   control the first switching circuit such that power is supplied from the battery to the touch input unit and no power is supplied from the battery to the first PMIC, wherein no power is supplied to the at least one processor as no power is supplied from the battery to the first PMIC,
   while power is supplied from the battery to the touch input unit and no power is supplied from the battery to the first PMIC, obtain an input through the touch input unit, and
   control, based on obtaining the input, the first switching circuit such that power is supplied from the battery to the first PMIC, wherein power is supplied from the battery to the at least one processor through the first PMIC as power is supplied from the battery to the first PMIC.

2. The electronic device of claim 1,
   wherein, based on power being supplied from the battery to the touch input unit and no power being supplied from the battery to the first PMIC, power is not supplied from the battery to the electrical components including the at least one processor through the first PMIC, and
   wherein based on power being supplied from the battery to the first PMIC, power is supplied from the battery to the electrical components through the first PMIC.

3. The electronic device of claim 1,
   wherein the touch input unit includes a touch IC and a touch panel, and
   wherein the touch IC is configured to:
   while power is supplied from the battery to the touch input unit and no power is supplied from the battery to the first PMIC, detect the input, and
   provide the detected input to the battery controller.

4. The electronic device of claim 1,
   wherein the touch input unit includes a touch IC and a touch panel, wherein the battery controller is configured to:
while power is supplied from the battery to the touch input unit and no power is supplied from the battery to the first PMIC, control the first switching circuit such power is supplied from the battery to the touch IC and a portion of the touch panel.

5. The electronic device of claim 1,
wherein the touch input unit is disposed on a side of the electronic device or in a region of a display of the electronic device.

6. The electronic device of claim 1,
wherein the electronic device does not include a physical key, and
wherein sides of the electronic device do not include a protruding portion.

7. The electronic device of claim 1,
wherein the electronic device further comprises a plurality of housings, at least one hinge configured to rotate the plurality of housings, and a foldable display disposed in the plurality of housings, and
wherein the touch input unit is disposed in a region corresponding to the at least one hinge in the electronic device.

8. The electronic device of claim 1, further comprising a second PMIC configured to manage power supplied to the touch input unit, and a second switching circuit connected between the first PMIC and the second PMIC,
wherein the battery controller is configured to:
based on the input, control the first switching circuit such that the battery and the first PMIC are connected, and
based on the input, control the second switching circuit such that the first PMIC and the second PMIC are connected.

9. The electronic device of claim 1, wherein the input includes an input of touching the touch input unit for a designated time or an input of touching the touch input unit two or more times.

10. The electronic device of claim 1,
wherein the at least one processor is configured to:
after power is supplied to the first PMIC, display an object through the display, and
based on a user input on the object, control the battery controller such that a control signal is provided to the battery controller, the control signal being configured to cause the battery controller to perform an operation controlling the first switching circuit such that power is supplied from the battery to the touch input unit and no power is supplied from the battery to the first PMIC.

11. A method for controlling power in an electronic device, comprising:
controlling, by a battery controller of the electronic device, a first switching circuit of the electronic device such that power is supplied from a battery of the electronic device to a touch input unit of the electronic device and no power is supplied from the battery to the first PMIC, the first PMIC being configured to manage power supplied to electrical components of the electronic device, the first switching circuit being connected to the battery and configured to selectively connect the touch input unit or the first PMIC to the battery, wherein no power is supplied to the at least one processor as no power is supplied from the battery to the first PMIC;
while power is supplied from the battery to the touch input unit and no power is supplied from the battery to the first PMIC, obtaining, by the battery controller, an input through the touch input unit; and controlling, by the battery controller, based obtaining on the input, the first switching circuit such that power is supplied from the battery to the first PMIC, wherein power is supplied from the battery to the at least one processor through the first PMIC as power is supplied from the battery to the first PMIC.

12. The method of claim 11,
wherein, based on power being supplied from the battery to the touch input unit and no power being supplied from the battery to the first PMIC, power is not supplied from the battery to the electrical components including the at least one processor through the first PMIC, and
wherein, based on power being supplied from the battery to the first PMIC, power is supplied from the battery to the electrical components through the first PMIC.

13. The method of claim 11,
wherein the touch input unit includes a touch IC and a touch panel,
wherein the method further comprises:
while power is supplied from the battery to the touch input unit and no power is supplied from the battery to the first PMIC, detecting, by the touch IC, the input; and
providing, by the touch IC, the detected input to the battery controller.

14. The method of claim 11,
wherein the touch input unit includes a touch IC and a touch panel,
wherein controlling the first switching circuit such that power is supplied from the battery to the touch input unit and no power is supplied from the battery to the first PMIC comprises:
while power is supplied from the battery to the touch input unit and no power is supplied from the battery to the first PMIC, controlling, by the battery controller, the first switching circuit such power is supplied from the battery to the touch IC and a portion of the touch panel.

15. The method of 11, wherein the touch input unit is disposed on a side of the electronic device or in a region of a display of the electronic device.

16. The method of claim 11,
wherein the electronic device does not include a physical key, and
wherein sides of the electronic device do not include a protruding portion.

17. The method of 11,
wherein the electronic device further comprises a plurality of housings, at least one hinge configured to rotate the plurality of housings, and a foldable display disposed in the plurality of housings, and
wherein the touch input unit is disposed in a region corresponding to the at least one hinge in the electronic device.

18. The method of claim 11,
wherein controlling, based on the input, the first switching circuit such that power is supplied from the battery to the first PMIC comprises:
based on the input, controlling the first switching circuit such that the battery and the first PMIC are connected; and
based on the input, controlling the second switching circuit such that the first PMIC and the second PMIC configured to manage power supplied to the touch input unit are connected.

19. The method of claim 11, wherein the input includes an input of touching the touch input unit for a designated time or an input of touching the touch input unit two or more times.

20. A non-transitory computer-readable medium storing computer-executable instructions, wherein the computer-executable instructions, when executed by a battery controller, cause an electronic device to:
- control a first switching circuit of the electronic device such that power is supplied from a battery of the electronic device to a touch input unit of the electronic device and no power is supplied from the battery to the first PMIC, the first PMIC being configured to manage power supplied to electrical components of the electronic device, the first switching circuit being connected to the battery and configured to selectively connect the touch input unit or the first PMIC to the battery, wherein no power is supplied to the at least one processor as no power is supplied from the battery to the first PMIC;
- while power is supplied from the battery to the touch input unit and no power is supplied from the battery to the first PMIC, obtain an input through the touch input unit; and
- control, based on obtaining the input, the first switching circuit such that power is supplied from the battery to the first PMIC, wherein power is supplied from the battery to the at least one processor through the first PMIC as power is supplied from the battery to the first PMIC.

* * * * *